US010158926B1

(12) United States Patent
Hoffman

(10) Patent No.: US 10,158,926 B1
(45) Date of Patent: *Dec. 18, 2018

(54) DIGITAL FINGERPRINTING OF LIVE EVENTS FOR AUTOMATIC DETECTION

(71) Applicant: Google Inc., Mountain View, CA (US)

(72) Inventor: Michael Theodor Hoffman, Portland, OR (US)

(73) Assignee: GOOGLE LLC, Mountain View, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 15/234,919

(22) Filed: Aug. 11, 2016

Related U.S. Application Data

(62) Division of application No. 13/565,235, filed on Aug. 2, 2012.

(51) Int. Cl.
| G06K 9/00 | (2006.01) |
| H04N 21/8358 | (2011.01) |
| H04N 21/235 | (2011.01) |
| H04N 21/254 | (2011.01) |
| H04N 21/2187 | (2011.01) |
| H04N 21/231 | (2011.01) |
| H04N 21/218 | (2011.01) |

(52) U.S. Cl.
CPC ..... *H04N 21/8358* (2013.01); *H04N 21/2187* (2013.01); *H04N 21/21805* (2013.01); *H04N 21/2353* (2013.01); *H04N 21/23109* (2013.01); *H04N 21/2541* (2013.01)

(58) Field of Classification Search
None
See application file for complete search history.

(56) References Cited

U.S. PATENT DOCUMENTS

| 6,229,550 B1 | 5/2001 | Gloudemans et al. |
| 6,411,725 B1 | 6/2002 | Rhoads |
| 7,168,084 B1 | 1/2007 | Hendricks et al. |
| 7,440,590 B1 | 10/2008 | Hassebrook et al. |
| 8,144,923 B2 | 3/2012 | Zhao et al. |
| 9,134,593 B1 | 9/2015 | Worley et al. |
| 2009/0213270 A1 | 8/2009 | Ismert et al. |

OTHER PUBLICATIONS

Lu, J., "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.

(Continued)

*Primary Examiner* — Vikkram Bali
(74) *Attorney, Agent, or Firm* — Young Basile Hanlon & MacFarlane, P.C.

(57) ABSTRACT

Aspects relate to causing one or more signals to be detectable within a live event such that devices that record at least a portion of the event also record the one or more signals. The signals can be used for later processing and categorization of received recordings in order to associate the recordings with the event. Further actions can be performed based on the association. Such actions include digital rights management, crowd-sourced experiences, and categorization of the event for searching and retrieval purposes.

18 Claims, 14 Drawing Sheets

(56) References Cited

OTHER PUBLICATIONS

Lu, J., "Video fingerprinting for copy identification: from research to industry applications," Proceedings of SPIE—Media Forensics and Security XI, vol. 7254, Jan. 2009, http://idm.pku.edu.cn/jiaoxue-MMF/2009VideoFingerprinting.sub.--SPIE-MFS- 09.pdf, Last accessed May 30, 2012.
Media Hedge, "Digital Fingerprinting," White Paper, Civolution and Gracenote, 2010, http://www.civolution.com/fileadmin/bestanden/white%20papers/Fingerprinti- ng%20-%20by%20Civolution%20and%20Gracenote%20-%202010.pdf, Last accessed May 30, 2012.
Milano, D., "Content Control: Digital Watermarking and Fingerprinting," White Paper, Rhozet, a business unit of Harmonic Inc., http://www.rhozet.com/whitepapers/Fingerprinting.sub.--Watermarking.pdf, Last accessed May 30, 2012.
United States Office Action, U.S. Appl. No. 13/565,235, dated Apr. 6, 2016, 12 pages.

DIGITAL FINGERPRINTING OF LIVE EVENTS FOR AUTOMATIC DETECTION

CROSS REFERENCE TO REPLATED APPLICATIONS

This application is a division of prior, co-pending U.S. patent application Ser. No. 13/565,235, filed on Aug. 2, 2012, which is incorporated herein by reference in its entirety for all purposes.

TECHNICAL FIELD

This disclosure relates to automatic detection of live events and digital fingerprinting of the live events for the automatic detection.

BACKGROUND

At any live event, such as a music concert, sporting event, theater performance, festival, and so forth, it is inevitable that people will record the event and publish the recordings online (e.g., upload to a video-sharing website). Such recordings may be primarily in the form of photos and videos. It is largely a manual process to tag media as containing recordings of a particular event. There are two primary objectives for performing the tagging. One objective is the enforcement of digital rights. The other objective is categorization for later searching and aggregation. Therefore, if the objective outcome is valuable enough, the costly and time consuming manual task of tagging the media is performed after the media is uploaded.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope of particular embodiments of the disclosure, or any scope of the claims. Its sole purpose is to present some concepts of the disclosure in a simplified form as a prelude to the more detailed description that is presented later.

In accordance with one or more embodiments and corresponding disclosure, various non-limiting aspects are described in connection with digital fingerprinting of live events for automatic detection and association of media recordings to the live event. In an implementation, provided is the automated identification of at least a portion of still and video recordings that were recorded at a live event and uploaded to one or more video-sharing websites or other locations. Tagging of the media can be performed before the media is uploaded or shared in a different manner.

The following description and the annexed drawings set forth certain illustrative aspects of the disclosure. These aspects are indicative, however, of but a few of the various ways in which the principles of the disclosure may be employed. Other advantages and novel features of the disclosure will become apparent from the following detailed description of the disclosure when considered in conjunction with the drawings.

BRIEF DESCRIPTION OF THE DRAWINGS

Various non-limiting implementations are further described with reference to the accompanying drawings in which.

DETAILED DESCRIPTION

Figure 1:
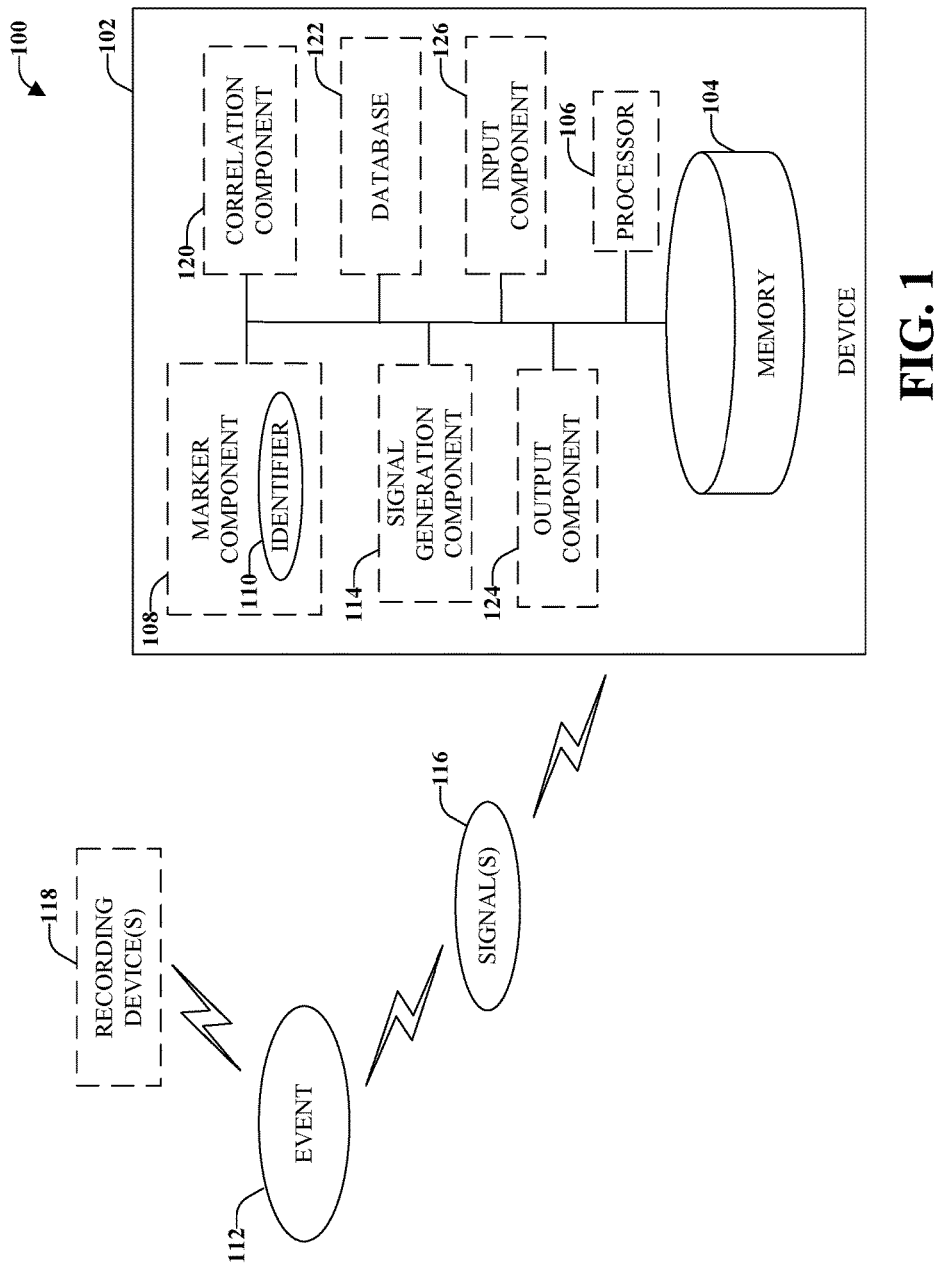
FIG. 1 illustrates an example non-limiting system that provides digital fingerprinting of live events for automatic detection, according to an embodiment.

Various embodiments or features of the subject disclosure are described with reference to the drawings, wherein like reference numerals are used to refer to like elements throughout. In the following description, for purposes of explanation, numerous specific details are set forth in order to provide a thorough understanding of the subject disclosure. It may be evident, however, that the disclosed subject matter can be practiced without these specific details, or with other methods, components, materials, and so forth. In other instances, well-known structures and components are shown in block diagram form in order to facilitate describing the subject disclosure.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

Many people attending events (e.g., concerts, sporting events, theater performances, festivals, and so forth) record the event in the form of photos, videos, and/or audios and publish the recordings online. The disclosed aspects relate to automated identification (or tagging) of the recordings for upload to a sharing database (e.g., online). The disclosed aspects can also detect and verify whether a recording relates to a physical scene at a particular time. The detection and verification can be used to determine if the recording is authorized (e.g., digital rights management). In another implementation, the detection and verification can be used to automatically assemble a crowd-sourced online experience of a live event for a variety of uploaded media sources or recordings (e.g., creation of social experiences from crowd sourced media), regardless of when the recordings are uploaded. In some implementations, the detection and verification can be used to automatically categorize photos and videos (e.g., automated media categorization) to allow for searching and aggregation as well as for other purposes.

In an implementation, one or more identifiers can be associated with an event, which can be a live event. The one or more identifiers can be used for recognition of the event or for recognition of a class of events (e.g., all events at a week-long music festival). In an example, the identifiers can be used to uniquely identify the event. One or more signals that can be detectable by a recording device can be generated and associated with the one or more identifiers. The signal(s) can be a digital audio signal, a digital image, and/or modulated light, for example. The association, the identifiers, and/or the signals can be retained in a database, for example. During the live event, the one or more signals can be output such that the signal(s) overlay at least a portion of the event, wherein the signal(s) can be captured by one or more of the recording device(s).

In a related implementation, one or more recordings of the event can be uploaded to a centralized sharing database. The recordings can be in the same or a similar format (e.g., in the form of still pictures) or in different formats (e.g., still pictures, audio recordings, video recordings, and so forth). Each of the recordings can comprise one or more signals that can be matched to identifiers associated with various live events. For example, the one or more signals can be matched against a set of identifiers stored in a database. If there is a match between the signal(s) and a live event, the recording(s) can be processed and one or more actions can be performed as a function of the match. For example, verification can be made as to whether (or not) the recording(s) satisfy a digital rights management condition. In another example, two or more recordings can be combined to create an aggregated social experience from at least two perspectives. In a further example, searchable elements can be associated with the recording(s) for later retrieval and search functions.

One non-limiting implementation relates to a system that can include a memory and a processor. The memory can store computer executable components and the processor can execute the computer executable components stored in the memory. The computer executable components can include a marker component that can associate an identifier with an event and a signal generation component that can create at least one signal that is detectable by a recording device. The computer executable components can also include a correlation component that can map the at least one signal to the identifier. The mapping can be retained in a database. Further, the computer executable components can include an output component that can transmit the at least one signal during the event. The at least one signal can overlay at least a portion of the event. According to an example, the first format can be one of a digital audio signal, a digital image, or a pattern of modulated light.

In an example, the output component can transmit the at least one signal from more than one angle. In another example, the output component can broadcast a digital audio signal that mixes with a plurality of audio signals generated at the event. In a further example, the output component can project a digital image in a direction of the event. The digital image can be superimposed on a captured picture of the event.

The digital image can comprise at least one color not readily perceivable by a human observer, in an example. In another example, the digital image can comprise dark pixels intermixed with occasional lighter pixels. The placement of the occasional lighter pixels can create the at least one signal.

In an example, the output component can be a laser projector. In another example, the output component can be a laser drawing device. According to an implementation, the output component can project a digital image in the direction of the event at a plurality of angles. In a further implementation, the output component can modulate a light source in a detectable pattern aimed at the event. The modulated light can be captured in a recorded video of the event.

The marker component can incorporate metadata related to the event with the identifier, according to an aspect. According to another aspect, the at least one signal can include a first format and the signal generation component can create a second signal that includes a second format. Further to this aspect, the correlation component can map the second signal to the identifier and the output component can transmit the second signal at about the same time as the at least one signal is transmitted.

Another non-limiting implementation relates to a method that can include using a processor to execute computer executable components stored in a memory. The method can include creating a first signal as a function of a first identifier associated with a real-time event and retaining a mapping that correlates the first signal to the first identifier. The method can also include causing the first signal to overlay at least a portion of the real-time event. The first signal can be detectable by one or more recording devices.

In an example, causing the first signal to overlay at least the portion of the real-time event can include transmitting at least a portion of the first signal in a direction aimed at the real-time event at two or more angles. In another example, causing the first signal to overlay at least the portion of the real-time event can include broadcasting a digital audio signal. The digital audio signal can mix with a plurality of audio signals generated at the real-time event. In a further example, causing the first signal to overlay at least the portion of the real-time event can include projecting at least a portion of a digital image in the direction aimed at the real-time event. The digital image can be superimposed on a picture of the real-time event. In yet another example, causing the first signal to overlay at least the portion of the real-time event can include modulating light in a detectable pattern in the direction aimed at the real-time event. The modulated light can be included in recorded video of the real-time event.

The method can also include generating a second signal that can comprise a format different from a format of the first signal and associating the second signal with the first identifier. Further, the method can include outputting the second signal to overlay at least a second portion of the real-time event. The second signal can be detectable by the recording device.

Still another non-limiting implementation relates to a device that can include a memory that stores computer executable components and a processor that can execute the computer executable components stored in the memory. The computer executable components can include a marker component that can associate an identifier and related metadata with a live event and a signal generation component that can create a first signal in a first format that is detectable by a recording device. The computer executable components can also include a correlation component that can map the first signal to the identifier. The mapping can be retained in a storage media. The computer executable components can also include an output component that can transmit the first signal during the live event. The first signal can overlay at least a portion of the live event.

Another non-limiting implementation relates to a system that can include a memory and a processor. The memory can store computer executable components and the processor can execute the computer executable components stored in the memory. The computer executable components can include a reception component that can receive a first recording of a live event that comprises at least one signal. Further, the computer executable components can include a mapping component that can match the at least one signal to an identifier associated with the live event. The computer executable components can also include an implementation component that can apply at least one action based on the matching performed by the mapping component. In an aspect, the recording of the live event can comprise a second signal and the mapping component can match the second signal to the identifier.

The reception component, according to an aspect, can receive a second recording that can comprise a second signal. Further to this aspect, the mapping component can match the second signal to the live event. The first recording and the second recording can be in a same format or can be in different formats. Additionally, the implementation component can aggregate the first recording and the second recording to create a social experience from at least two perspectives.

According to an aspect, the implementation component can retrieve a digital rights management policy as a function of the at least one signal. In another aspect, the implementation component can categorize the first recording for searchable elements.

In an example, the at least one signal can be a digital audio signal that is mixed with a plurality of audio signals generated at the live event. In another example, the at least one signal can be a digital image projected in a direction of the live event. The digital image can be superimposed on a picture of the live event. In a further example, the at least one signal can be a light modulated in a detectable pattern aimed at the live event and captured in the first recording.

According to various implementations, the first recording can be an audio version of the live event. According to other implementations, the first recording can be a still picture of the live event. In still other implementations, the first recording can be a video of the live event.

Another non-limiting implementation relates to a method the can include employing a processor to execute computer executable components stored within a memory. The method can also include receiving a first recording comprising a first signal and accessing a database comprising a plurality of signals mapped to a plurality of identifiers associated with events and matching the first signal to at least one of the plurality of signals. The method can further include associating the first recording to an event based on the matching and triggering an action as a function of the associating.

In an example, the triggering can comprise retrieving a digital rights management policy as a function of at least one of the plurality of signals. According to another example, the triggering can comprise associating searchable elements with the first recording.

The method, according to an aspect, can also include receiving a second recording that comprises a second signal and matching the second signal to the event. The method can also include aggregating the first recording and the second recording. Further to this aspect, the aggregating can comprise creating a social experience from at least two perspectives. According to another aspect, the first recording and the second recording can be in a same format or in a different format.

Still another non-limiting implementation relates to a device that can include a memory that stores computer executable components and a processor that can execute the computer executable components stored in the memory. The computer executable components can include a reception component that can receive a first recording of an event. The first recording can comprise at least one signal and can be in a first format. The computer executable components can also include a mapping component that can match at least one signal to a predefined identifier associated with the event. The predefined identifier can include metadata related to the event. Further, the computer executable components can include an implementation component that can apply at least one action based on the matching performed by the mapping component.

In an aspect, the reception component can receive a second recording of the event. The second recording can comprise a second signal and the mapping component can match the second signal to the predefined identifier associated with the event. Further to this aspect, the device can also include an aggregation component that can combine the first recording and the second recording to create a collective social experience.

Referring initially to FIG. 1, illustrated is an example non-limiting system 100 that provides digital fingerprinting of live events for automatic detection, according to an embodiment. As discussed, the disclosed aspects provide for the automated identification of at least a portion of still photos, video recordings, and/or audio recordings that were captured at a live event and uploaded to a video-sharing website or to a different forum type. The identification can be used for digital rights management, automated categorization, creating social experiences from crowd sourced media, and so forth.

Digital fingerprinting technologies can be utilized for automatically identifying digital media recordings. For example, a digital fingerprint can be added to a digital image in such a way that the image is only slightly degraded in fidelity in exchange for imprinting a highly indelible identifier in the image that can survive a large amount of image processing before the identifier is lost (or can no longer be detected). This is possible because the identifier can be applied to the entire image in a somewhat holographic manner. To obtain successful fingerprinting, a small amount of information can be redundantly applied over the entire recording. A detector can then be employed to extract the identifier from the image, wherein the identifier can be used to verify the origin and owner of the image. For example, a digital photo can be taken or an image can be created using image editing applications, then a digital fingerprint identifier can be added after-the-fact, but before the image is made available publicly. From then on, even significantly modified versions of the original image, such as cropping and/or color enhancement, can still be identified as being from that same source. Such detection can be performed using a detection algorithm.

In an implementation an audio recording, photo, and/or video can be identified as containing a recording of a particular physical venue within a particular time frame (e.g., a real-time event or a live event). The identification can be used for a wide variety of applications, which can include ensuring that unauthorized recordings of a live performance are not made publicly available without proper permissions (and payments). Another application can be to automatically assemble a crowd-sourced online experience of a live event from a variety of uploaded media sources in near real-time (or after the fact). Another application can be to automatically categorize photos and videos such that the photos and videos can be easily searched and aggregated using a variety of techniques.

Various embodiments of the systems, apparatuses, and/or processes explained in this disclosure can constitute machine-executable components embodied within one or more machines, such as, for example, embodied in one or more computer readable mediums (or media) associated with one or more machines. Such component(s), when executed by the one or more machines (e.g., computer(s), computing device(s), virtual machine(s), and so on) can cause the machine(s) to perform the operations described.

System 100 can be included, at least partially, on a device 102. The device 102 can be for example, a projector, a laser drawing device, a mobile phone, a desktop computer, a tablet computer, a laptop computer, a gaming device, and other types of communication devices. In an example of a projector, the projector can be a chromatic (e.g., non-laser) projector. In an implementation, the projector can be a RGB (red, green, blue) projector. In another implementation, the projector can be a specialized projector intended to project light waves at the edge of human perception while still being detectable by a recording device (as will be discussed in further detail below). The projector can cover a multitude of different ranges of wavelengths.

The device 102 can include a memory 104 that stores computer executable components and instructions. The device 102 can also include a processor 106 that executes the computer executable components and instructions stored in the memory 104. It should be noted that although one or more computer executable components may be described herein and illustrated as components separate from memory 104, in accordance with various embodiments, the one or more computer executable components could be stored in the memory 104.

In an embodiment, device 102 includes a marker component 108 that associates an identifier 110 with an event 112. The event 112 can be any live event, both public (e.g., rock concert, political debate) and private (e.g., birthday party, family reunion). In an example, the marker component 108 can create a unique identifier for each event. In an implementation, the marker component 108 creates (unique) identifiers for different portions of a single event or a series of events held at the same venue. For example, a music concert might have different performers or group of performers (e.g., bands) and a unique identifier can be associated with each performer or group of performers. In another example, two or more performers (e.g., musicians) might be associated with similar identifiers.

A signal generation component 114 can be operatively coupled to the marker component 108. The signal generation component 114 can create at least one signal 116 that is detectable by recording devices 118. The recording devices 118 can be any devices that can capture imagery and/or audio (e.g., a camera, a smart phone, a microphone, and so forth). The signal 116 can include at least one identifier 110. Further, the signal can exist in a multitude of forms. For example, the signal can be designed to be largely unnoticed by human observers, but largely detectable by digital recording devices, such as recording devices 118, (e.g., through digital fingerprinting technologies for digital imaging).

In another example for detecting audio recordings, the signal could be a digital audio signal intended to be broadcast over speakers at the live event. Alternatively or additionally, the signal could be mixed with audio signals generated by other aspects of the event such as the audio signals from microphones used by musicians.

In a further example for detecting still photos and video, the signal could be a digital image that is projected onto the scene by a video projector, a laser drawing device, or another device. In an implementation, the projected digital image can be mostly dark (e.g., minimally altering the scene) but can contain the occasional lighter pixel. In another implementation, the projected digital image can take advantage of colors that can be less detectable by human observers in the particular scene. The placement of the lighter pixels can create a signal then can be detected to reconstruct the original identifier while altering the scene minimally in such a way that human observers should not be able to notice the projected image.

In yet another example for detecting videos, the signal can be strategically located light spots. In an implementation, the light spots can be modulated over time in a detectable pattern. Additional types of signals that can be utilized with the disclosed aspects are provided below with reference to FIG. 6.

For any live event or series of live events, any combination of the above noted signals could be broadcast into the scene at the venue. For example, multiple signals of the same format or different formats can be utilized. Such multiple signals can make it more difficult to mask or remove the signals from the recoding.

Operatively coupled to the marker component 108 and the signal generation component 114 can be a correlation component 120 that maps the at least one signal 116 to the identifier 110. For example, the mapping can be a one-to-one association between the signal and the identifier. In another example, the mapping can be a one-to-many relationship (e.g., one identifier to multiple signals). The mapping can be retained in a database 122. Although illustrated as included in device 102, in some implementations, the database 122 (or one or more system components) could be located remotely (e.g., not included in device 102).

In an implementation, the identifier can represent an integer value (e.g., a 32-bit integer, a 64-bit integer) that can be used to identify the real-world event, such as a specific concert of a specific musician at a specific time and date at a specific location. In an alternate implementation, the identifier can identify a class of such events, such as all events at a week-long music festival. The database 122 can retain information that can associate each valid identifier with the appropriate class of events and associated metadata describing a variety of attributes at the event.

An output component 124, operatively coupled to the other system components, can transmit at least one signal 116 during the event 112. The at least one signal 116 can overlay at least a portion of the event 112. For example, the output component 124 can cause a signal to overlay audio of the event such that recording devices that capture an audio recording of the event can also capture the signal. The signal can be a signature signal or a second signal. In another example, the signal can be projected at a stage such that recording devices that capture an image of the stage, including the objects and/or people on the stage, can also capture a visual signal that is overlaid (or comingled with) the image of the stage.

In an implementation, the output component 124 can output the signal such that the signal is "sprayed" in a direction aimed at the event in a movable manner, similar to a laser light show. The spraying of the signal can cause the signal to be output at different directions. In another implementation, the output component 124 can be coupled to an input component 126 that can detect the scene and determine whether one or more changes should be made to the signal(s) being output. For example, the signal strength can be automatically enhanced.

In an example, the signal can be output using video projector technologies. Such technologies can include a LCD (liquid crystal display) coupled with a lamp, a CRT (cathode ray tube), DLP (digital light processing) and LCOS (liquid crystal on silicon), for example.

Figure 2:
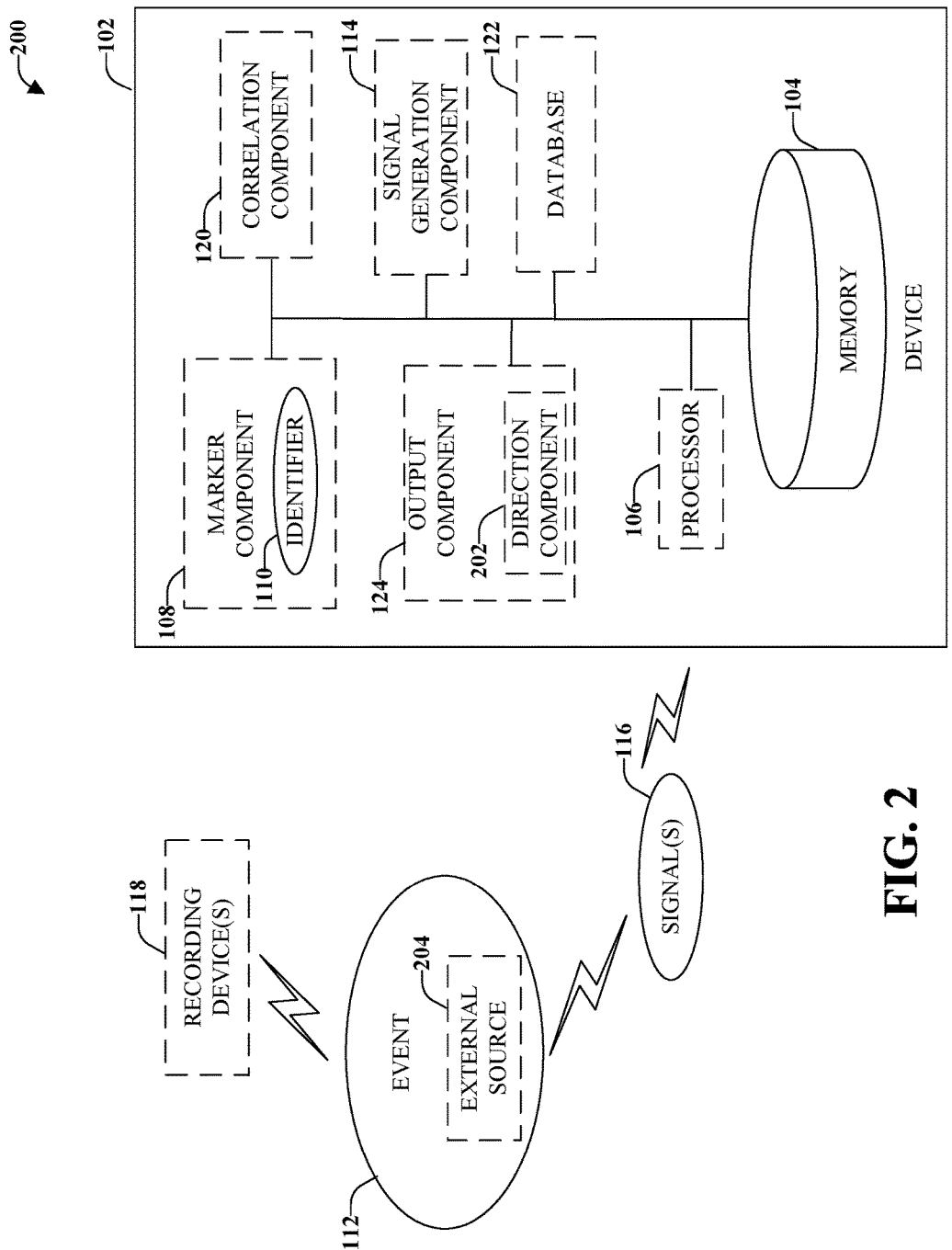
FIG. 2 illustrates another example non-limiting system that provides digital fingerprinting of live events for automatic detection, according to an embodiment.

FIG. 2 illustrates another example non-limiting system 200 that provides digital fingerprinting of live events for automatic detection, according to an embodiment. To accommodate the multi-dimensional nature of events, the same signal or multiple signals (or portions thereof) may be broadcast from more than one angle such that the signal(s) can be better detected from a wide variety of recording angles and/or recording devices. In an implementation, the output component 124 can comprise a direction component 202 that can be configured to transmit at least one signal 116 from more than one angle. For example, a signal can be transmitted by the direction component 202 such that the signal exits the output component 124 at two or more angles and/or in two or more directions. In another example, the direction component 202 can output two or more signals in such a manner that the signals exit the output component 124 at multiple angles. In an implementation, outputting multiple signals could make it more difficult to mask or remove the signals from a recording of the event.

In an implementation, as one or more recording devices 118 are capturing the event 112, the recording devices 118 might be in different locations. For example, at a music concert a first recording device might be located in front of and in very close proximity to the stage on which the performance is occurring. A second recording device might be located to the left of the stage and at a greater distance away from the stage as compared to the first recording device. If a signal were to be transmitted by the output component 124 in a single direction, that signal might only be viewable by one of the devices (or neither of the devices). However, if the signal is transmitted at multiple angles from the output component 124, the signal can be detected by a larger number of recording devices 118.

Further, for better ability to detect the signal(s), the output component 124 might only project the signal onto specific portions of the scene such that most digital recordings of the scene are likely to include the portion of the scene that contains the projected signal. For example, the signal may be projected directly onto a relatively flat backdrop behind the musicians since it might be determined that the most amount of recordings should be focused on the stage where the musicians are performing.

It should be noted that in the implementations and examples discussed herein, the various signals may be created using different mathematical algorithms that are appropriate for the various types of projection. Further, the various signals should be capable of detection and should be able to be converted back to (or associated with) the same or a similar identifier. In other words, there may be a one-to-one relationship, a one-to-many, a many-to-one, or a many-to-many relationship between signals and identifiers.

For example, there can be two visual fingerprint projectors at the event to help ensure better detection of the signals. The two visual fingerprint projectors can include an audio fingerprint emitter for audio detection and a fingerprinted poster in the scene, for example. Multiple people can be capturing photos and/or video recordings. Each of the many captured photos and video recordings may detectably contain anywhere from none to all of the superimposed fingerprinting signals. A confidence level can be used among all the signals detected in each captured photo/video to make a better match to the event, as will be discussed in further detail below.

In another implementation, two or more signals can be created by signal generation component 114 and transmitted in a direction toward the event 112 by output component 124. For example, a first signal created by signal generation component 114 can be in a first format (e.g., an audible format) and a second signal created by signal generation component 114 can be in a second format (e.g., a visual format). The correlation component 120 can map the second signal to the identifier 110 and the output component 124 can transmit the second signal at about the same time as the first signal is transmitted. The term "about the same time" can include at least some time overlap where the first signal and the second signal are transmitted during a same time period. In an example, the first format is one of a digital audio signal, a digital image, or a pattern of modulated light. Further to this example, the second format can be the same as the first format or a different format (e.g., a different one of a digital audio signal, a digital image, or a pattern of modulated light).

In an implementation, the signal might be associated with an external source 204. For example, the signal may be applied to a digital image that is physically printed where the printed image is then introduced into the scene at the real-world event. An example of an external source 204 is a printed poster of a digital image that contains the signal, wherein the printed poster is displayed at the event (e.g., hung on a wall, positioned as a backdrop behind a speaker at the event, and so forth). At the time of the actual event, any number of participants in the event may capture portions of the event as well as portions of the external source, such as by snapping photos, recording audio, and taking videos. Some of these captured recordings can be uploaded to various social networking sites and/or video sharing websites.

In an implementation, if the event is well lit (e.g., a play, a concert, and so forth), an external source 204 can include a Liquid Crystal Display (LCD) shutter that is placed on a flood light. The LCD shutter can be generally transparent and can have the occasional dark pixel blocking light. In this scenario, the occasional dark pixels can be projected as blurred dark spots since no lenses are involved. However, the occasional dark pixels can still be detectable with an appropriate algorithm. Similarly, a lens could allow the projection to be focused. For example, the lens can be configured to cause the signal to be projected in a direction aimed at a particular object, person, location, and so forth.

Figure 3:
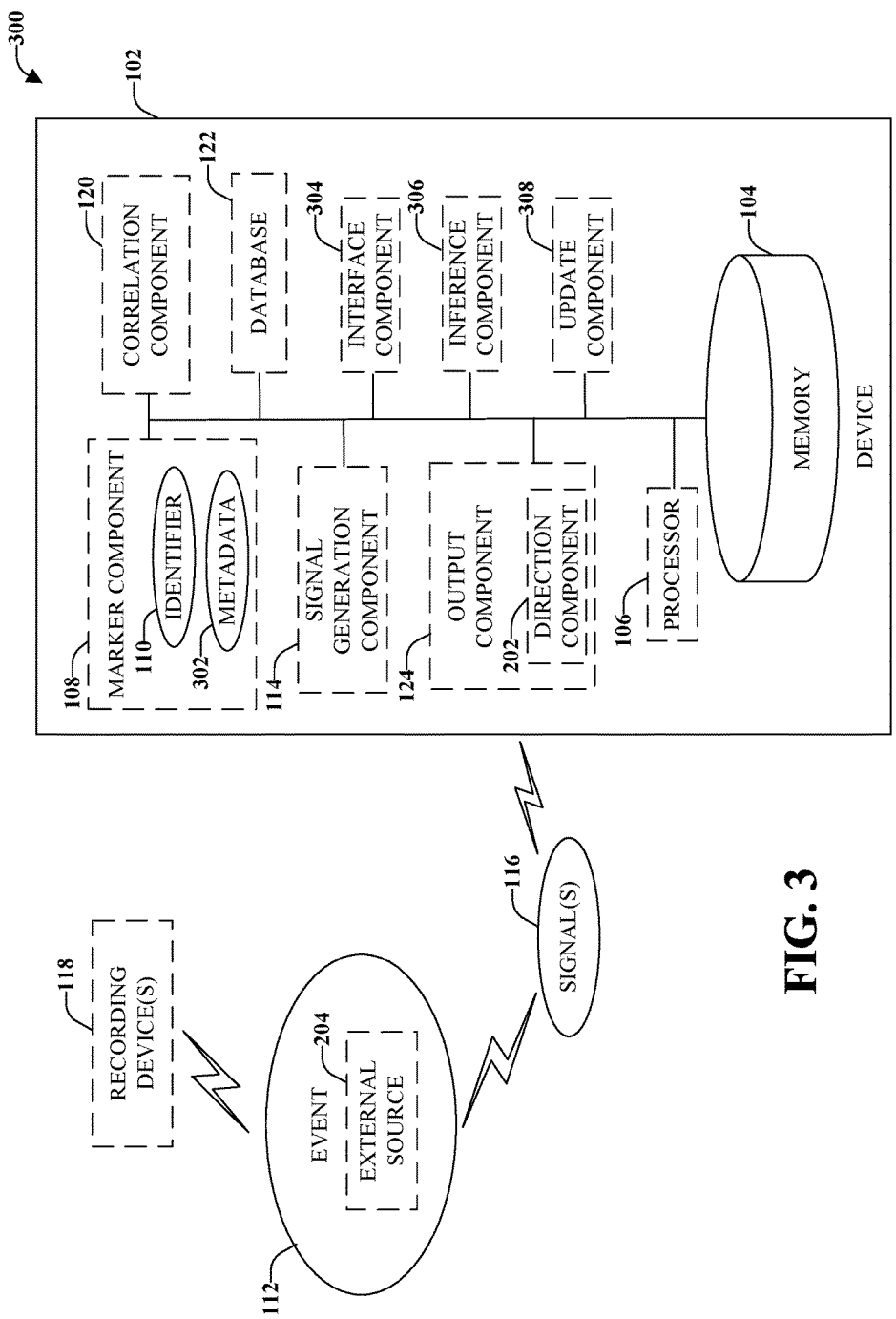
FIG. 3 illustrates another system that associates metadata with a live event, according to an embodiment.

FIG. 3 illustrates another system 300 that associates metadata with a live event, according to an embodiment. Metadata 302, related to the event 112, can be created and associated with the identifier 110. The metadata 302 can include, but is not limited to, references to the event, who owns the rights to the event, recording and usage policies, actions to be performed when a recording that contains the identifier is detected, and so forth. In an example, references to the event can include who performed at the event, where the event took place, when the event took place, and so forth. In another example, actions to be performed can include any number or type of additional processes or actions. For example, an action can be to combine the recording with one or more other recordings to create a crowd-sourced media.

The metadata 302 can be received through various means (e.g., keyboard, mouse, speech recognition software, touch screen display, and so forth. In an example, an interface component 304 can be provided that allows one or more inputs to be received from a user and/or entity. The inputs can be received directly at device 102 or remotely (e.g., through various wireless communications means). A user can be an event organizer, an entity authorized to interact directly with the systems, and so forth. An entity can be the Internet, another system, a computer, machinery, and so forth. For purposes of simplicity a user and/or entity is simply referred to a user or users, depending on the context.

For example, a person responsible for organizing the event (or authorized by the event organizer) can provide inputs related to features of the event. For example, an event organizer can interact with system 300 (e.g., through interface component 304) in order to provide various types of information related to the event. As discussed above, the event organizer can interact directly with system 300 or remotely (e.g., through the Internet) in order to provide the information.

In accordance with some aspects, the metadata related to the event can automatically be created based on automatic identification of various aspects of the event. Such automatic creation of metadata can be performed by an inference component 306 that infers one more pieces of information that should be categorized with the event. For example, in the case of a musical event, the performers might automatically be recognized by the inference component 306 through various recognition techniques (e.g., facial recognition, voice recognition, and so forth). Inference component 306 can automatically apply the metadata 302 to the identifier 110 and/or can solicit feedback for confirmation of the inferred information. For example, various prompts can be output to a user through interface component 304 for confirmation thereof.

In an implementation, the metadata 302 can be updated when there are changes related to various parameters associated with the event, which can be during the event or at any time after the event has occurred. For example, if the owner of the rights to the event changes, the information can be received by an update component 308 (or another system component). The update component 308 can interact with the correlation component 120 and/or with the database 122 to apply one or more changes to the metadata 302. For example, the licensing rights or digital rights might be transferred and, therefore, information about the new owner of the digital rights managements can be included in the metadata.

In another example, one or more actions that should be performed when the identifier is detected can be changed. In an example, the action might be that the recording should be removed from the public domain however, over time, it might be acceptable for the recording to be used in the public domain and, therefore, the metadata can be changed such that automatic removal of the recording is not necessarily performed.

Figure 4:
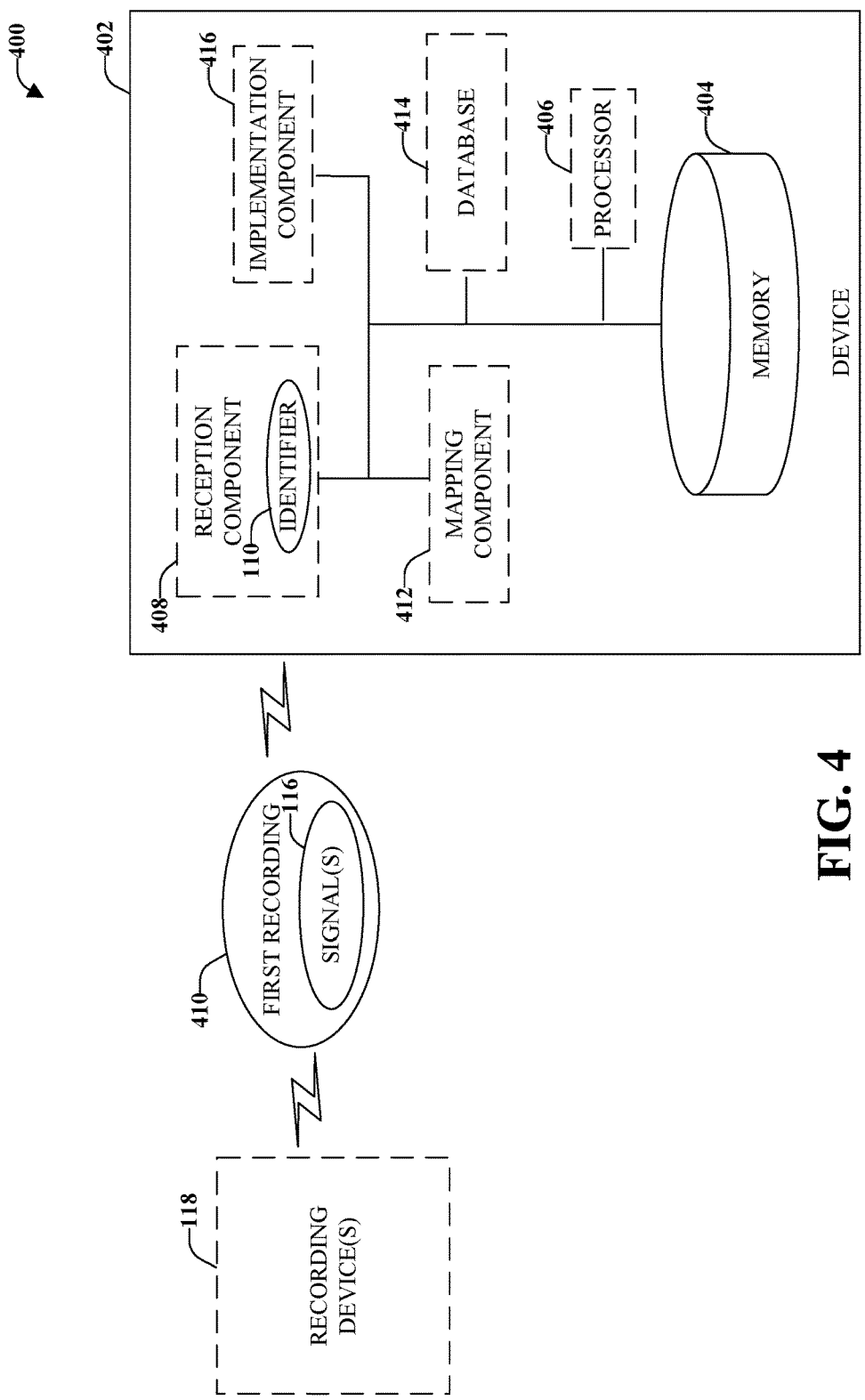
FIG. 4 illustrates another example non-limiting system that identifies a recording of a live event based on an identifier within the recording, according to an embodiment.

FIG. 4 illustrates another example non-limiting system 400 that identifies a recording of a live event based on an identifier within the recording, according to an embodiment. System 400 can be included, at least partially, in a device 402. The device 402 can be for example, a network, a server, a mobile phone, a desktop computer, a tablet computer, a laptop computer, a gaming device, and other types of communication devices. The device 402 can include a memory 404 that stores computer executable components and instructions. The device 402 can also include a processor 406 that executes the computer executable components and instructions stored in the memory 404. It should be noted that although one or more computer executable components may be described herein and illustrated as components separate from memory 404, in accordance with various embodiments, the one or more computer executable components could be stored in the memory 404.

Device 402 can receive one or more recordings of a live event and identity the recordings based on information derived from the recordings. The recordings can be received in the format of digital media files when these files are uploaded to various video, audio, and/or photo sharing websites.

Included in the device 402 is a reception component 408 that receives a first recording 410 of a live event. In an example, the first recording can be an audio version of at least a portion of the event. In another example, the first recording can be a still picture of the event. In a further example, the first recording can be a video of at least a portion of the event.

The first recording 410 can be received from a recording device 118 that captured at least a portion of the event and that also captured at least one signal 116 associated with the event. However, the disclosed aspects are not so limited and the first recording 410 can be received from a different device. For example, a participant at the event might take a picture during the event and subsequently transfer the picture to another device, such as a personal computer, and use the personal computer to upload the picture to a photo sharing website.

In an implementation, the signal can be detected using a Complementary Metal-Oxide-Semiconductor (CMOS) detector or a similar device. In another example, an infrared signal can be output (e.g., by an output component) where there is a constant, or nearly constant, wavelength that is being streamed. The infrared signal might not be detectable by the human eye, however, the CMOS device should be able to detect the signal.

The at least one signal can be a second signal or a signature signal that are added to the recorded signal. This signature signal can be detected from analyzing the recorded signal. In an aspect, the signal(s) projected at (or located within) the venue can be redundant such that the sum total of all the bits in the signal can be used to reconstruct the signal, even in the presence of error and/or lost information. For example, if the signal is not detected in one frame, the signal might be detected in another frame or in another scene.

A mapping component 412 is operatively coupled to the reception component 408 and matches the signal 116 to at least one identifier 110 associated with the event. In an example, the signal can be a digital audio signal that is mixed with a plurality of audio signals generated at the event. In another example, the signal can be a digital image that was projected in a direction toward the event and captured in the first recording. In a further example, the signal can be a light modulated in a detectable pattern (e.g., detectable by various recording devices) aimed in a direction toward the event.

In an implementation, the mapping component 412 can access a database 414 that contains a list or association between identifiers and events. In an aspect, database 414 is the same as database 122. However, the disclosed aspects are not so limited and the databases 414, 122 can be different databases that operatively communicate information. The databases 414, 122 can by synchronized database or unsynchronized databases.

Operatively coupled to the mapping component 412 can be an implementation component 416 that applies at least one action based on the matching performed by the mapping component 412. In an implementation, the implementation component 416 retrieves a digital rights management policy as a function of the signal 116. The digital rights management policy can be used to process various functions. In an implementation, a function can be to enforce rights by automatically removing the recording from a website. In another implementation, a function can be to solicit a license for a fee in order for the recording to be used (e.g., by the website, by the source of the recording, and so forth). In a further implementation, a function can be to match the submitter of the recording with that individual's digital rights to publish the recording. Another function can be to invoke business logic related to the event. For example, an action might be to provide the submitter of the recording with advertisements related to the event or to different events that might be of interest to the submitter (based upon an inference).

Thus, the ingestion process of the uploaded digital media files can include a step of extracting an identifier as a function of the signals. These signals can contain at least a portion of the projected signal(s). If at least one such identifier is detected in the received signal, that identifier can be used to search a database of all previously stored identifiers for a match. If the received identifier matches a stored projected identifier, all or a portion of the metadata associated with the projected identifier can be retrieved. This metadata can include, but is not limited to, references to the event. Such references can include the type of event (e.g., music, festival, sporting, and so forth), who performed at the vent, where the event took place, when the event took place, and so forth. Another reference can be an identification of a person(s) or entity (e.g., company) that owns the rights to the event. A further reference can include information related to recording and usage polices. Still another example of a reference can be instructions of which actions should be performed when the identifier is detected. The retrieved metadata associated with the projected identifier can be used to signal any number of additional processes or actions, according to an aspect. In an implementation, an action can be to automatically assign attribution to and/or categorize photos and videos. In an example, audio, images, and/or video can be automatically tagged with the name of the performer(s), type of event, the venue, data and/or time of the event, and so forth. Such tags can be used for later searching.

Figure 5:
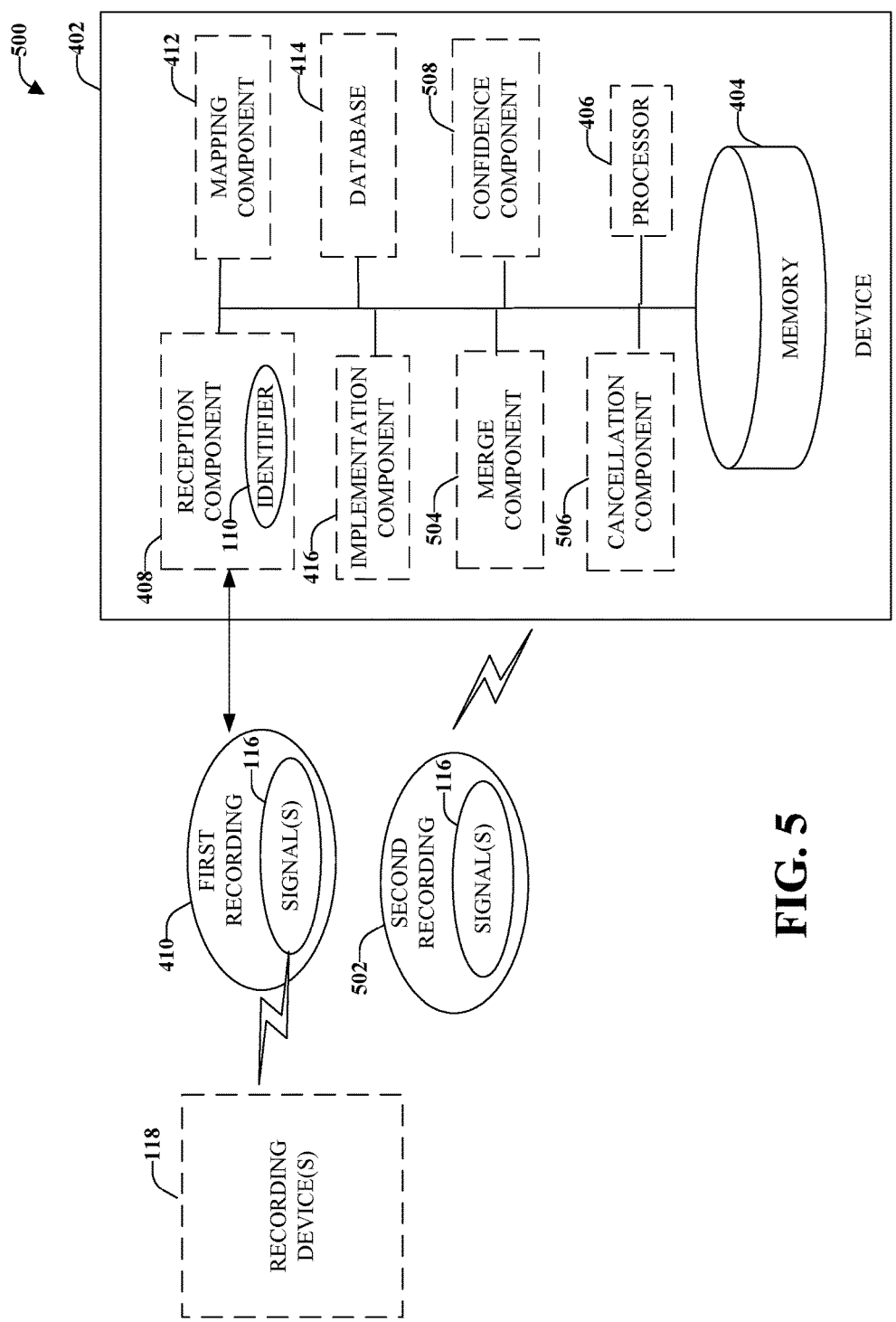
FIG. 5 illustrates another non-limiting example system for identifying a recording of a live event, according to an embodiment.

FIG. 5 illustrates another non-limiting example system 500 for identifying a recording of a live event, according to an embodiment. At various live events, participants at those events capture portions of the event in the form of recordings or digital media files. These digital media files are often shared with others through various communication means, including websites.

The recordings can be received at various times during or after a live event. In some cases, the recordings might be received while the event is occurring, the same day as the event occurred, or sometime thereafter (e.g., days, weeks, months, years). In some cases only a single recording (e.g., first recording 410) of the event is received. However, as illustrated in FIG. 5, more than one recording can be received, which is illustrated as a second recording 502, although there can be more than two recordings received. The first recording 410 and the second recording 502 can be in a same format or in a different format. For example, one can be in an audio format and another can be in a visual format.

The second recording 502 (and/or subsequent recordings) can include the signal 116 contained in the first recording 410, which indicates that both the first recording 410 and the second recording 502 are of the same event.

In some cases, the second recording 502 can include a signal that is different than the signal 116 contained in the first recording 410. In this case, the second signal can be matched to the identifier 110 by the mapping component 412 in a manner similar to the manner the first signal 116 is mapped by the mapping component 412. For example, the mapping component 412 can match the second signal to an event, which can be an event different from the event captured by the first recording 410. However, in some implementations, an event can be associated with more than one signal. Therefore, although the second recording might include a different signal than the signal captured in the first recording, mapping component 412 might determine that both signals are related to the same event.

In an aspect, the mapping component 412 indicates to a merge component 504 that the first recording 410 and the second recording 502 are related to the same event. The merge component 504 aggregates the first recording 410 and the second recording 502 to create a social experience from at least two perspectives (e.g., a first perspective based on the first recording 410 and a second perspective based on the second recording 502). In an implementation, merge component 504 can identify common portions of the first recording 410 and the second recording 502. For example, a common portion might include a similar audio track. In another example, a similar portion can include identification of movements of a performer and similar movements between the recordings can be linked, even if one of the recordings is a still photo.

In another example, merge component 504 can create a composite of videos, event sponsored information and other metadata. The composite can be represented as a single cross-world experience.

In a further example, when combining more than one signal, one form of signal might be static over time while another form of signal changes over time. A signal that might be static over time includes superimposing a static image on a scene for a long period of time. A signal that changes over time can include superimposing an audio signal or a video signal.

According to some aspects, when aggregating for social experiences and/or for search, after the automated stages of detection, manual stages can also be included. Such manual stages can be utilized to mitigate false positives, to add false negatives, and/or to verify low-confidence matches. Such manual stages can be facilitated through an interface component, for example.

In an implementation, a cancellation component 506, operatively connected to other system components, can remove extraneous data from the first recording 410 and/or the second recording 502. For example, when a social experience is created and more than one recording includes background noise, at least some of the background noise can be removed. In another example, background noise from the first recording 410 can be removed but the background noise from the second recording 502 might not be removed (or vice versa). In another example, background noise from both recording is removed or substantially reduced.

Additionally or alternatively, system 500 includes a confidence component 508, operatively connected to memory 404, that can assign a confidence level as a function of the one or more signals detected in each captured photo, video, audio, and so forth. The confidence level can be used to verify whether the different recordings are related to the same event. For example, when two or more recordings are received, each recording might have a different format and/or a different signal contained therein. In an implementation, there can be two visual fingerprint projectors located within the event to facilitate better detection of the signal. One projector can be an audio fingerprint emitter for audio detection and a second projector can be a fingerprinted poster displayed at the event. There can be multiple people capturing photos and video recordings. Each of the many captured photos and video recordings may detectably contain anywhere from none to all of the superimposed fingerprinting signals. Thus, confidence component 508 can use a "confidence" level among all signals detected in each captured recording to better match those recordings to the event and to each of the other recordings. In an implementation, an inference component can be associated with the confidence component 508 to infer the confidence level. The confidence level can be a fuzzy confidence level that indicates there is a better match to one event than to other events. The confidence level of all detected signals could be combined to increase the accuracy of the confidence level.

In an implementation, event-centric user experiences that aggregate all media that can be identified as being associated with the event are created. Some media may be identified as previously described. Alternatively or additionally, some media can be identified by time and/or Global Positioning System (GPS) metadata included with the media. In another implementation, the media can be identified through manual identification and tagging by the person that recorded the event or by others in a crowd-sourced manner.

In an implementation, a confidence level can be further increased by utilizing other sources of information that may be available. Such sources of information can include the time the media (e.g., photo, video, audio, and so forth) was recorded and/or geo-location information (e.g., longitude, latitude, altitude) included with the media. However, if the additional sources of information do not match metadata associated with the event, it might not necessary be an indication of a negative match to the event by itself since, in some instances, the additional sources of information might be inaccurate. For example, a day and time of day embedded in the media by a recording device might be inaccurate due to the recording device being programmed with an incorrect day and time. Thus, confidence component 508 might utilize the other sources of information to assign a confidence level in some cases and ignore the information in other cases.

For example, in an implementation, the confidence component 508 can uses at least two signals to increase a level of confidence that the at least one signal is associated with the live event. In another implementation, the confidence component 508 can combine the at least one signal with global positioning system information or time information to increase a level of confidence that the at least one signal is associated with the live event.

Figure 6:
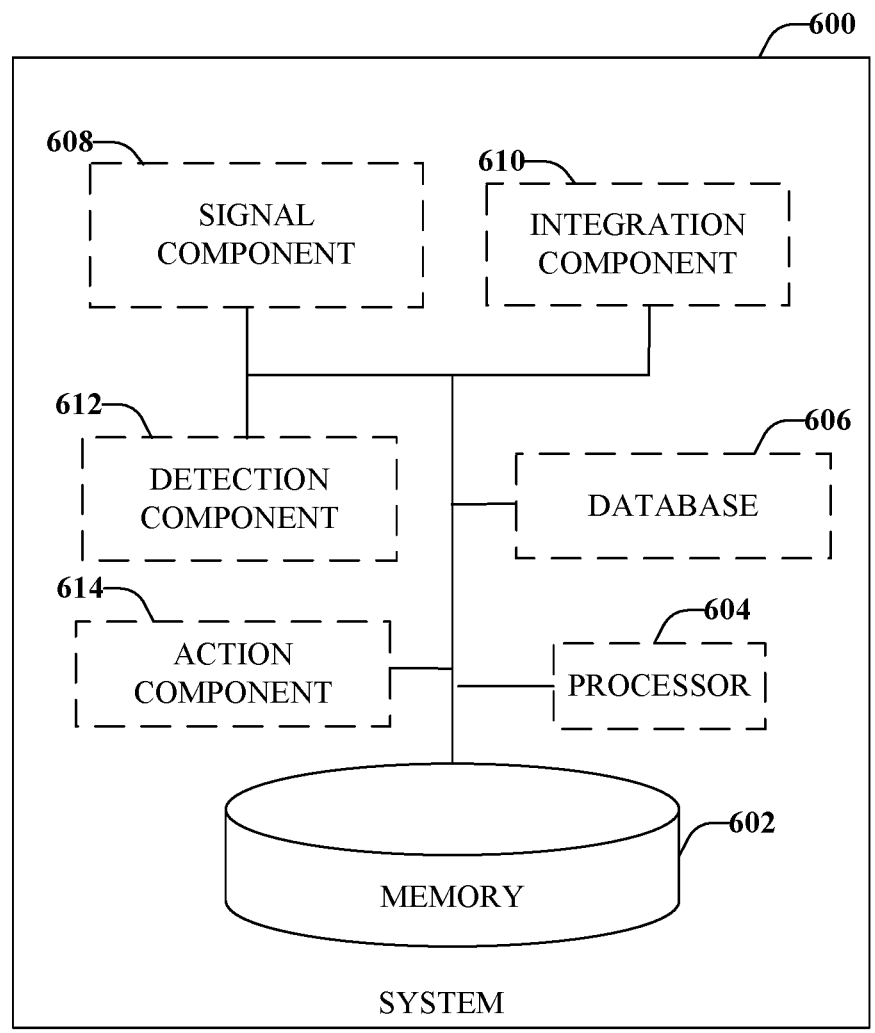
FIG. 6 illustrates a simplified representation of an example, non-limiting end-to-end system that can capture one or more portions of a live event as digital media files and can automatically detect and associate the digital media files, according to an embodiment.

FIG. 6 illustrates a simplified representation of an example, non-limiting end-to-end system 600 that can be configured to capture one or more portions of a live event as digital media files and can automatically detect and associate the digital media files, according to an embodiment. System 600 can include at least one memory 602 and at least one processor 604. The memory 602 can store computer executable components and instructions and the processor 604 can execute the computer executable components and instructions stored in the memory 602. Although one or more computer executable components may be described herein and illustrated as components separate from (e.g., operatively connected to) memory 602, in accordance with various embodiments, the one or more computer executable components could be stored in the memory 602. System 600 can also include a database 606 (e.g., database 122, database 414) that contains identifiers and associated event metadata.

Also included in system can be a signal component 608 (e.g., signal generation component 114) that can generate digital fingerprint signals (e.g., signal 116). The signal component 608 can derive at least one signal as a function of an identifier correlated to an event. The various algorithms for generating the signals can include various techniques including adaptations of techniques utilized for digital image and audio fingerprinting. As an example, a digital fingerprint image overlay can be a standard digital fingerprint applied to an all black image. This predominantly black image overlay can be projected onto the scene at a live event. However, in some implementations an adaptation of various fingerprinting techniques can be made for usage at live events.

An example of a signal type can be a digital fingerprint image overly for (front or rear) projection into a scene at the live event. Another example can be a digital fingerprint light pattern modulation over time for projection into the scene. A further example of a signal type can be a digital fingerprint applied to a digital image for printing and placing the printed materials into the scene. In a further example, the signal type can be a digital fingerprint applied to a digital image for display on a monitor in the scene. Another signal type can include modulating at least one light source, such as an LED placed in the scene. Still a further signal type can include a digital fingerprint audio overlay for mixing with other audio sources. Further, a signal type can include a digital fingerprint audio signal for audio projection at the scene. In another example, a signal type can be a digital fingerprint video signal for video projection (e.g., front projection, rear projection) into the scene. Yet another signal type can include a digital fingerprint applied to video for display on a monitor located in the scene. In another example, a signal type can be a digital fingerprint applied to clothing worn by performers (e.g., can be useful for close-up photos of performers). A signal type, according to another example, can be a laser projector that projects a modulated light signal onto a scene.

In a further example, a barcode (e.g., a standard barcode, a specialized barcode, a matrix barcode (or two-dimensional code) and so forth) can be placed and/or projected in the scene. The barcode can be detected in various photos and video. Although the barcode might be perceived by event participants, the barcode can be obscured by foreground objects in a scene, according to an implementation. Further, the visible nature of the barcode can make it easier to mask or remove the barcode image from the scene. The removal of the barcode image can be performed manually and/or automatically.

System 600 can also include an integration component 610 (e.g., output component 124) that can integrate the fingerprint signals into digital media streams. For example, integration component 610 can embed a fingerprint into an audio stream, an image stream, and/or a video stream. In some aspects, integration component 610 can embed different fingerprints into each of the different formats. For example, a first fingerprint can be embedded into an audio stream, a second fingerprint can be embedded into an image stream, and a third fingerprint can be embedded into a video stream. The first, second, and third fingerprints can be different fingerprints that are associated with the same or a similar event. In an example, the integration component 610 can be a projection device that projects that at least one signal into the event.

One or more recording devices can record at least one perspective of the event that contains the at least one signal. The perspectives can include an audio, a photo, and/or a video perspective. In another example, the perspectives can include a certain angle, different angles, a certain time frame, different time frames, and so forth.

Also included in system 600 can be a detection component 612 (e.g., reception component 408, mapping component 412) that can receive a recording and that can detect a digital fingerprint in the media stream. Continuing the above example, the detection component 612 can detect the first fingerprint within the audio stream, the second fingerprint within the image stream, and the third fingerprint in the video stream. An action component 614 (e.g., implementation component 416) can trigger one or more actions based on the detection of the digital fingerprints.

According to an implementation, the detection component 612 can detect the signal and calculate an identifier based on the signal. In another implementation, the detection component 612 can detect a plurality of signals contained in the recording (or multiple recordings) and can calculate an identifier as a function of the plurality of signals. A confidence level can be calculated as a function of the signal and the action can be performed based on the confidence level.

An action that can be performed includes detection and/or enforcement of digital rights. Another action can include automatically tagging of media. A further action can include aggregating media into associated sets. Creation of social experiences can be another action that can be performed. A further action can be to associate or connect people who have experienced the same event or similar events.

In an implementation, the various aspects can be utilized for time stamping different recordings that are of the same event. In another implementation, the various recordings (e.g., videos) can be stitched together to create a panoramic experience. People can also find each other and share related experiences through utilization of the disclosed aspects. In an example, videos of a school play can be stitched together to create an entire video.

While, for purposes of simplicity of explanation, the following methods are shown and described as a series of acts, the disclosed subject matter is not limited by the order of acts, as some acts may occur in different orders and/or concurrently with other acts from that shown and described herein. For example, those skilled in the art will understand and appreciate that a method can alternatively be represented as a series of interrelated states or events, such as in a state diagram. Moreover, not all illustrated acts may be required to implement a method in accordance with the disclosed subject matter. Additionally, it is to be appreciated that the methods disclosed in this detailed description are capable of being stored on an article of manufacture to facilitate transporting and transferring such methodologies to computers or other computing devices. For example, the disclosed aspects can be provided as a back-end infrastructure and Application Programming Interfaces (APIs) that enable the various aspects to be provided as a means to detect media recordings of an event. The various methods disclosed herein can use a processor to execute computer executable components and instructions stored in a memory.

Figure 7:
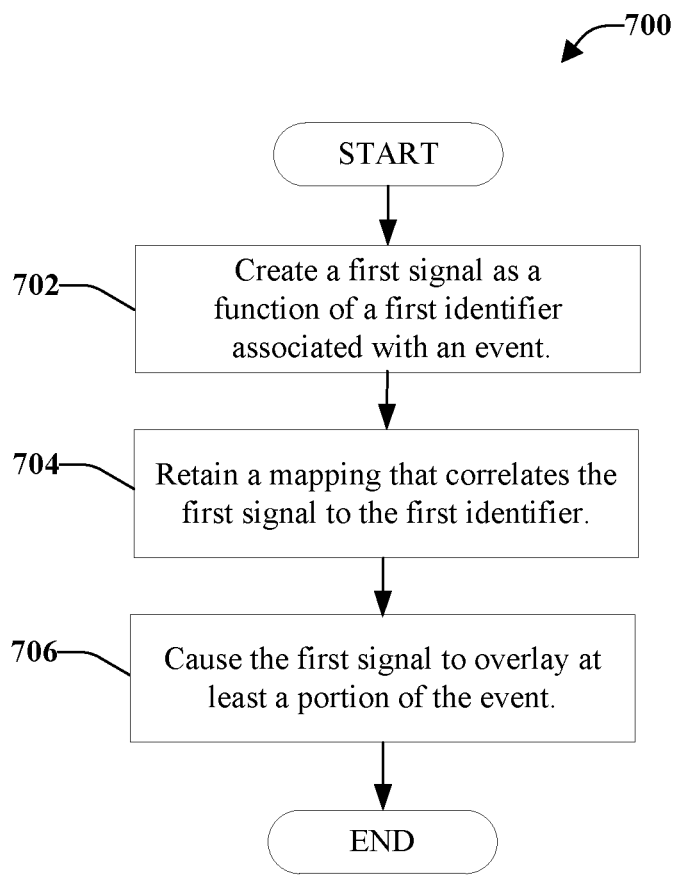
FIG. 7 illustrates an example non-limiting method for performing digital fingerprinting of live events, according to an embodiment.

FIG. 7 illustrates an example non-limiting method 700 for performing digital fingerprinting of live events, according to an embodiment. Method 700 can provide a means of establishing a detectable identifier at a physical venue such that at least a fraction of recordings of that venue can subsequently be detected as containing a recording of that physical venue during a particular time frame.

At 702, a first signal can be created as a function of a first identifier associated with an event, such as a live or real-time event (e.g., using a signal generation component or a signal component). The event can be any type of live event, both public and private.

A mapping that correlates the first signal to the first identifier can be retained at 704 (e.g., using a database). The correlation between the first signal and the first identifier can be a mapping or a cross-reference between the signal(s) and the identifier(s). There can be a one-to-one relationship, a one-to-many relationship, a many-to-one relationship, or a many-to-many relationship between identifiers and signals.

Method 700 continues, at 706, by causing the first signal to overlay at least a portion of the event (e.g., using an output component or an integration component). The first signal can be detectable by a recording device (e.g. using recording devices). For example, the first signal can overlay at least an audio portion of the event to allow recording devices, located at the venue or receiving streaming audio of the venue (e.g., during the event or any time after the event), to capture the signal at substantially the same time as the audio is being captured. In another example, the signal can be projected in a direction toward one or more locations at the event (e.g., at the stage, at the entrance to the event, and so forth), so that the recording device is able to capture those locations, including objects and/or people located at or near those locations, as well as the signal being projected toward the locations.

In an implementation, at about the same time as the event occurs, the event might be broadcast (e.g., over the Internet or through other wireless communication means). Therefore, although a person (and associated recording device) might not be located at the event, the device can capture portions of the event. The signals overlaying the one or more portions of the event can also be captured by the recording devices located at the event or devices that can remotely capture portions of the event. Further, the signals can be further conveyed such that at any time after the event, when one or more portions of the event are subsequently recorded, the signals can be included in that subsequent recording.

Figure 8:
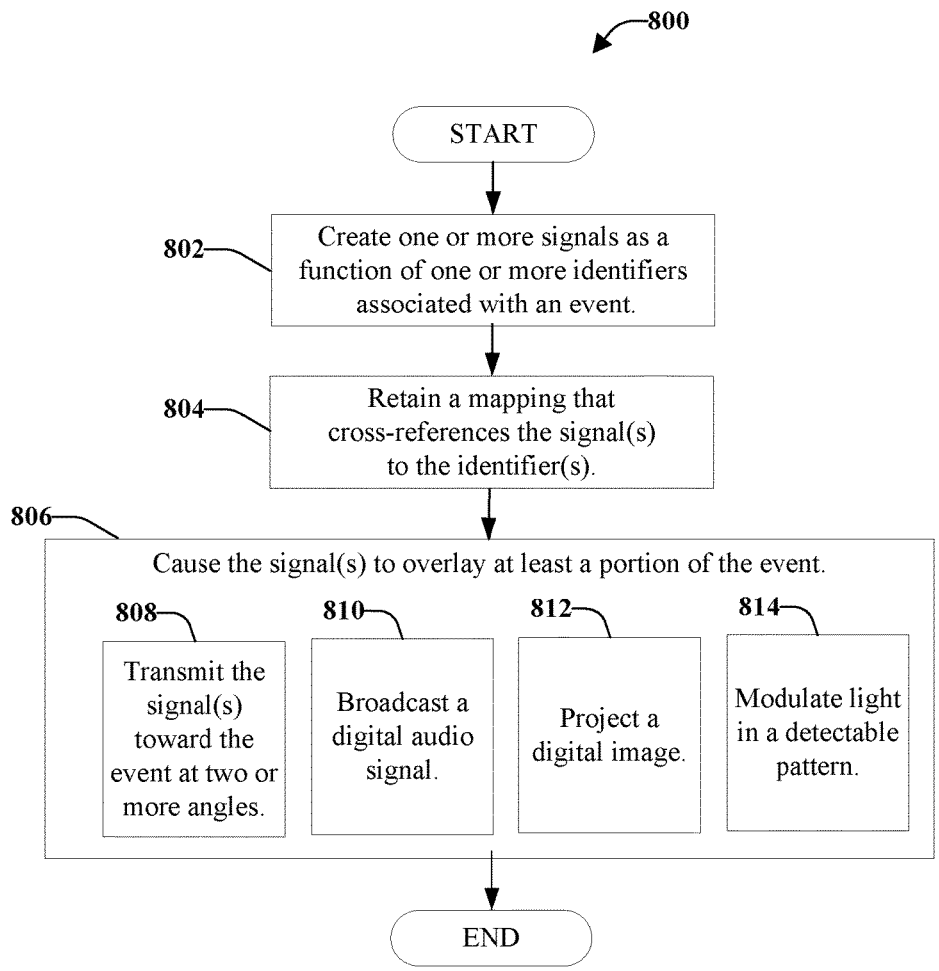
FIG. 8 illustrates another exemplary, non-limiting method for tagging one or more portions of a live event, according to an embodiment.

FIG. 8 illustrates another exemplary, non-limiting method 800 for tagging one or more portions of a live event, according to an embodiment. At 802, one or more signals are created (e.g., using a signal generation component or a signal component) based on one or more identifiers associated with an event. As discussed, the relationship between identifiers and signals can be a one-to-one relationship, a one-to-many relationship, a many-to-one relationship, or a many-to-many relationship.

A mapping that cross-references the signal(s) to the identifier(s) is created (e.g., using a correlation component). This mapping can be retained, at 804, such as in a database or other storage media, for later retrieval when a recording is received and it is desirable to determine if the recording matches any of the retained signaled and/or identifiers.

At 806, the signal(s) are output (e.g., using an output component) such that the signals overlay at least a portion of the event. In an implementation, at 808, the signal(s) are transmitted in a direction toward the event at two or more angles (e.g., using a direction component). For example, a single signal can be transmitted in such a manner that recording devices located in various locations at the live event location (or remotely) can capture the signal. In another example, different signals can be transmitted where each of the signals can be transmitted at one or more different angles.

In another implementation, at 810, a digital audio signal is broadcast (e.g., using an output component). The digital audio signal can be broadcast such that the digital audio signal mixes with a plurality of audio signals generated at the event. Additionally or alternatively, at 812, at least a portion of a digital image is projected in a direction aimed at the event (e.g., using the output component). The digital image can be superimposed on a picture of the event. Additionally or alternatively, at 814, light can be modulated in a detectable pattern aimed at the event (e.g., using the output component). The modulated light can be included in a recorded video of the event.

Figure 9:
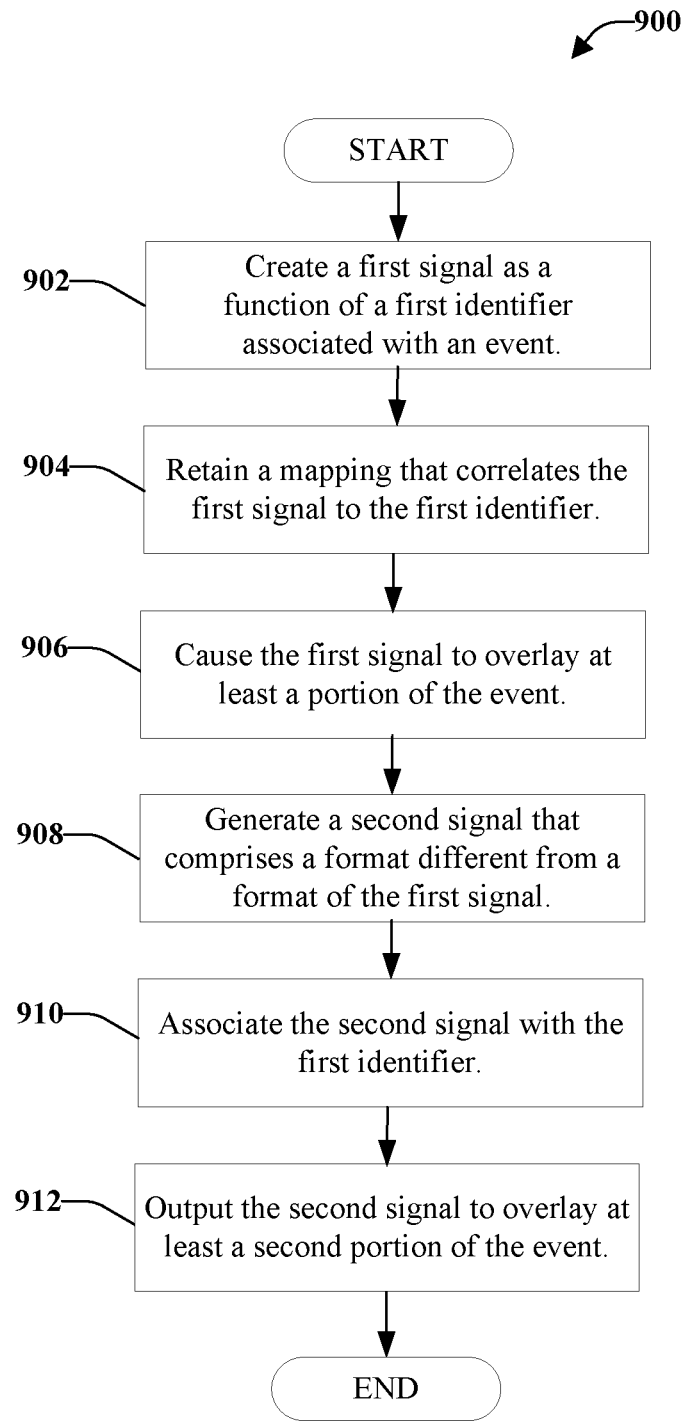
FIG. 9 illustrates another example, non-limiting method for causing one or more signals to overlay at least a portion of an event, according to an embodiment.

FIG. 9 illustrates another example, non-limiting method 900 for causing one or more signals to overlay at least a portion of an event, according to an embodiment. At 902, a first signal can be created (e.g., using a signal generation component) as a function of a first identifier associated with the event. In an implementation, metadata can be associated with the first identifier. At 904, a mapping that correlates the first signal to the first identifier can be created (e.g., using a correlation component) and retained (e.g., in a storage media). At 906, the first signal is output (e.g., using an output component) such that the first signal overlays at least a portion of the event.

Method 900 continues, at 908, when a second signal is generated (e.g., using the signal generation component). The second signal can comprise a format different from a format of the first signal. For example, the first signal can be in the format of a digital audio signal, a digital image, or a pattern of modulated light. At 910, the second signal can be associated with the first identifier (e.g., using the correlation component). The second signal can be output at 912 (e.g., using the output component). The second signal can be output to overlay at least a second portion of the event. The second signal can be detectable by the recording device (e.g., one or more of recording devices). For example, the signals can be a visual signal and an audio signal projected on the same event.

Figure 10:
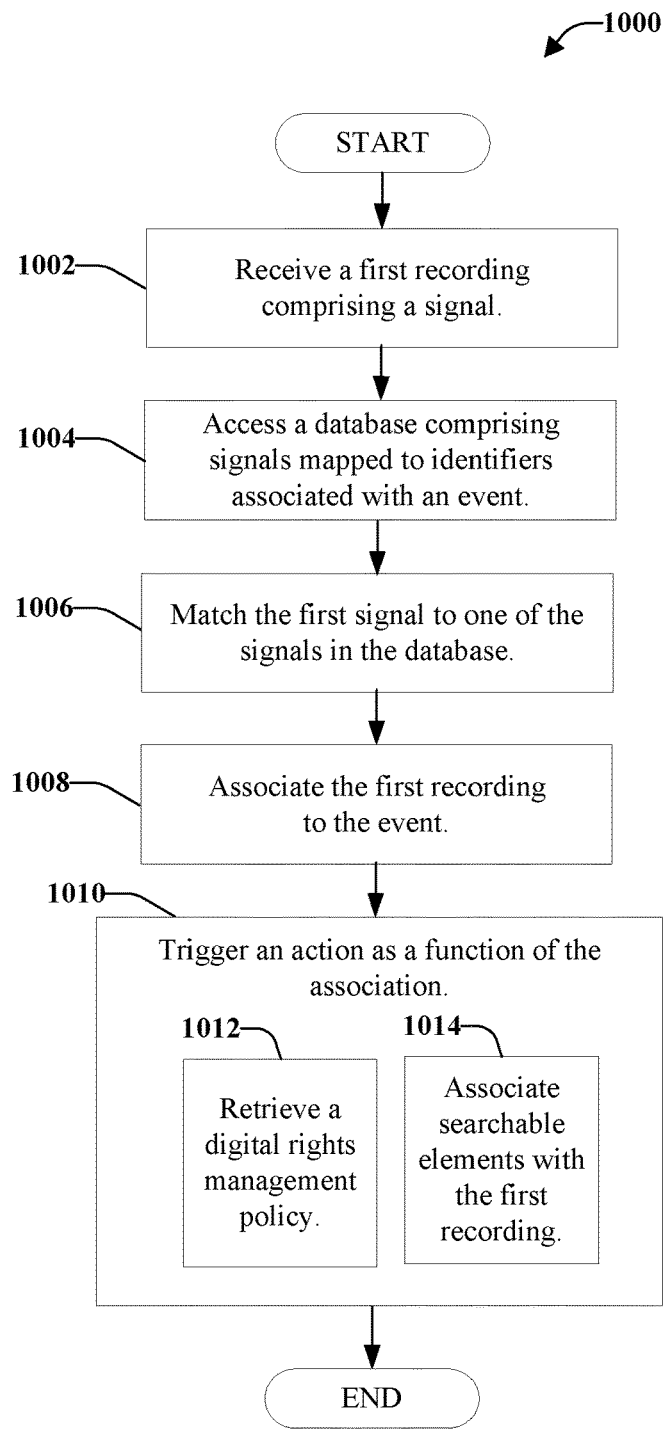
FIG. 10 illustrates an example, non-limiting method for detecting one or more signals contained in a recording, according to an embodiment.

FIG. 10 illustrates an example, non-limiting method 1000 for detecting one or more signals contained in a recording, according to an embodiment. At 1002, a first recording comprising a first signal is received (e.g., using a reception component). The first recording can be uploaded to a video-sharing website, for example. At 1004, a database comprising a plurality of signals mapped to a plurality of identifiers associated with events is accessed (e.g., using a mapping component). For example, at about the same time that the first recording is uploaded, signals contained in the recording can be identified and compared to known signals that have been created for various live events.

At 1006, the first signal is matched to at least one of the plurality of signals (e.g., using the mapping component). If the first signal does not match any of the known signals, no further action is taken. If there is a match at 1006, method 1000 continues, at 1008 and the first recording is associated with the event (e.g., using the mapping component).

An action is triggered, at 1010, based on the association of the recording to the event (e.g., using an implementation component). In an example implementation, the action that is triggered comprises, at 1012, retrieving a digital rights management policy (e.g., using the implementation component). In another example implementation, the action that is triggered comprises, associating searchable elements with the first recording, at 1014 (e.g., using the implementation component). For example, the searchable elements can be categorized based on the metadata. In another example, the searchable elements can be categorized based on information derived from the recording. For example, in the case of an audio recording the information derived can be based on key words or phrases, voice recognition (e.g., to identify the speaker) and so forth. In the case of a photo or a video the information can be derived based on recognition of depicted words or phrases, recognition of an object, facial recognition, and so on.

Figure 11:
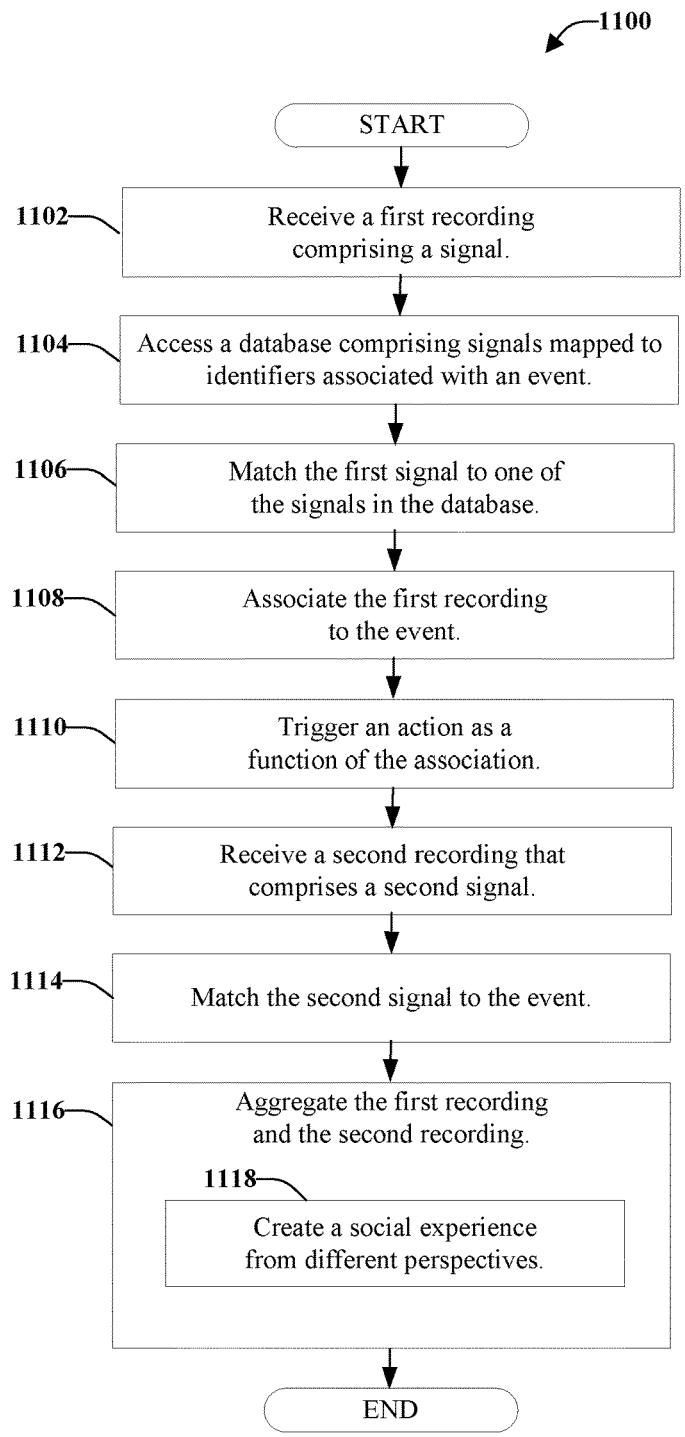
FIG. 11 illustrates another example, non-limiting method for receiving multiple recordings of an event and creating a crowd-sourced experience from the multiple recordings, according to an embodiment.

FIG. 11 illustrates another example, non-limiting method 1100 for receiving multiple recordings of an event and creating a crowd-sourced experience from the multiple recordings, according to an embodiment. At 1102, a first recording comprising a first signal is received (e.g., using a reception component). A database comprising signals mapped or cross-referenced to identifiers is accessed, at 1104 (e.g., using a mapping component). The first signal can be matched to one of the signals in the database, at 1106, and the first recording can be associated with the event, at 1108 (e.g., using the mapping component). One or more actions can be triggered as a function of the association, at 1110 (e.g., using an implementation component).

At 1112, a second recording that comprises a second signal is received (e.g., using the reception component). The second signal can be in a same format as the first signal or, according to some aspects, the second signal can be in a different format than the first signal. The second signal is matched to the event, at 1114 (e.g., using the mapping component).

Based on the match, the first recording and the second recording are aggregated, at 1116 (e.g., using a merge component). According to an implementation, the aggregation includes creating, at 1118, a social experience from different perspectives (e.g., the perspectives represented by the first recording and the second recording and/or subsequent recordings).

Figure 12:
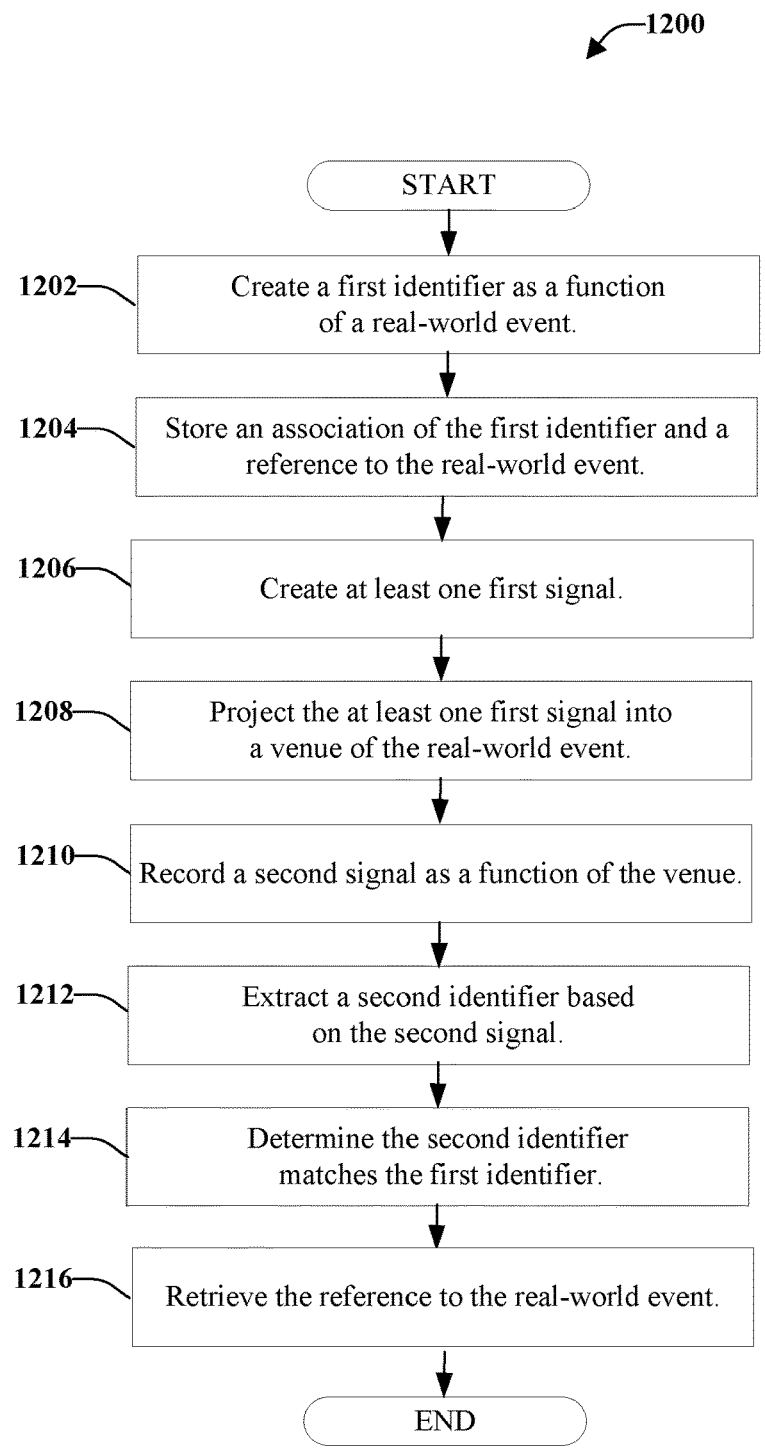
FIG. 12 illustrates an example, non-limiting method for digital fingerprinting of live events for automatic detection, according to an embodiment.

FIG. 12 illustrates an example, non-limiting method 1200 for digital fingerprinting of live events for automatic detection, according to an embodiment. As disclosed herein, a detectable identifier can be established at a physical venue so that recordings of that venue can be subsequently detected and associated with the physical venue. Such detection can be used for digital rights management, automated media categorization, creating social experiences from crowd sourced media, and so forth.

Method 1200 starts at 1202 when a first identifier is created as a function of a real-world event (e.g., using a marker component). The association of the first identifier and a reference to the real-world event is stored, at 1204 (e.g., using a database). For example, the association can be stored in a storage media.

At 1206, at least one first signal is created as a function of the first identifier (e.g., using a signal generation component). The at least one first signal is projected (e.g., using an output component), at 1208, onto a venue of the real-world event.

A second signal is recorded, at 1210, as a function of the venue containing at least a portion of the projected at least one first signal (e.g., using one or more recording devices). The second identifier is extracted, at 1212, as a function of the second signal (e.g., using a reception component).

At 1214, a determination is made that the second identifier matches the first identifier (e.g., using a mapping component). Based on the match, the reference to the real-world event is retrieved, at 1216 (e.g., using the mapping component). One or more actions can be performed (e.g., using an implementation component) as a function of the match between the reference and the real-world event.

Figure 13:
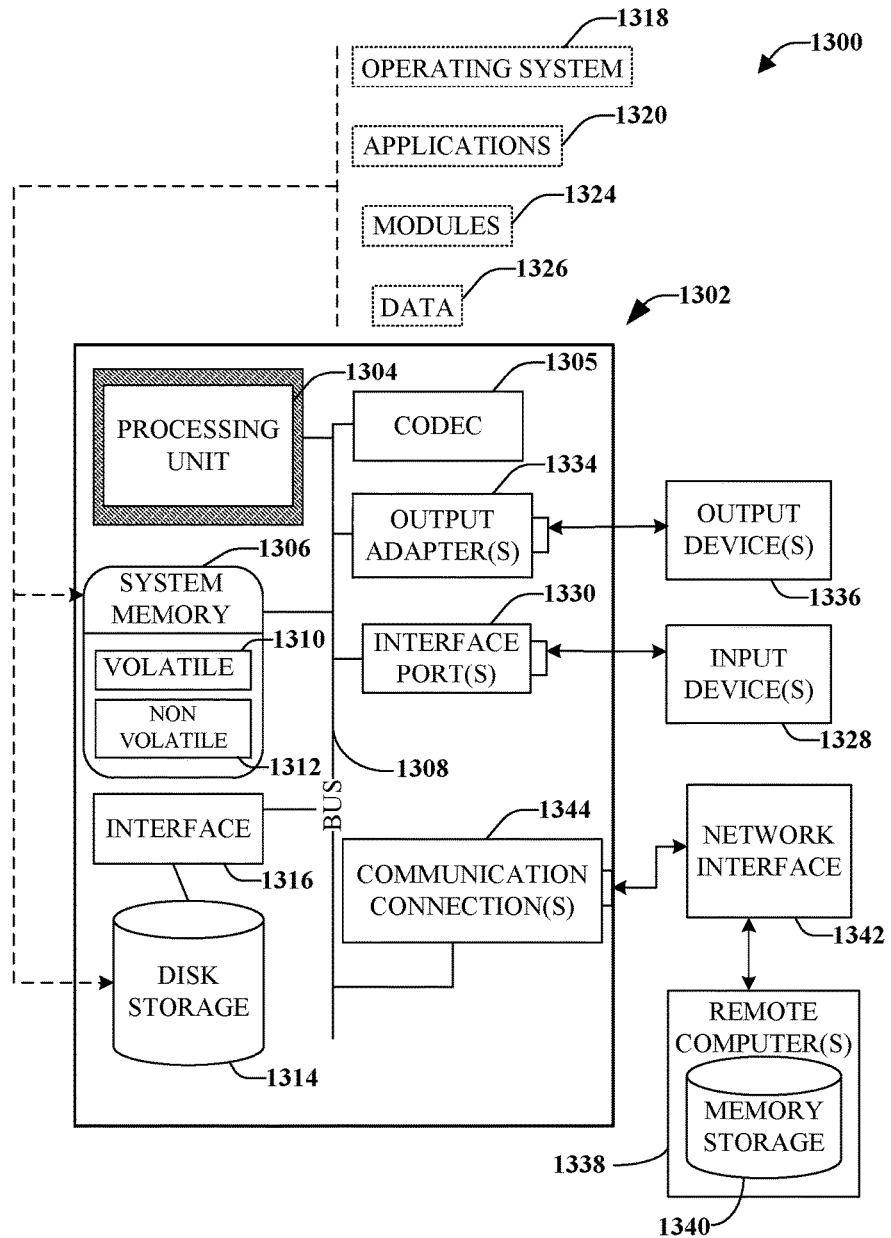
FIG. 13 illustrates a block diagram representing an exemplary non-limiting networked environment in which various embodiments can be implemented.

With reference to FIG. 13, a suitable environment 1300 for implementing various embodiments of the disclosed subject matter includes a computer 1302. It is to be appreciated that the computer 1302 can be employed to implement one or more of the systems or components shown and described in connection with FIGS. 1-6. The computer 1302 includes a processing unit 1304, a system memory 1306, a codec 1305, and a system bus 1308. The system bus 1308 couples system components including, but not limited to, the system memory 1306 to the processing unit 1304. The processing unit 1304 can be any of various available processors. Dual microprocessors and other multiprocessor architectures also can be employed as the processing unit 1304.

The system bus 1308 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1306 includes volatile memory 1310 and non-volatile memory 1312. The basic input/output system (BIOS), containing the basic routines to transfer information between elements within the computer 1302, such as during start-up, is stored in non-volatile memory 1312. In addition, according to an embodiment, codec 1305 may include at least one of an encoder or decoder, wherein the at least one of an encoder or decoder may comprise hardware, a combination of hardware and software, or software. Although, codec 1305 is depicted as a separate component, codec 1305 may be contained within non-volatile memory 1312. By way of illustration, and not limitation, non-volatile memory 1312 can include read only memory (ROM), programmable ROM (PROM), electrically programmable ROM (EPROM), electrically erasable programmable ROM (EEPROM), or flash memory. Volatile memory 1310 includes random access memory (RAM), which acts as external cache memory. According to various embodiments, the volatile memory may store write operation retry logic (not shown in FIG. 13) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1302 may also include removable/non-removable, volatile/non-volatile computer storage medium. FIG. 13 illustrates, for example, disk storage 1314. Disk storage 1314 includes, but is not limited to, devices such as a magnetic disk drive, solid state disk (SSD) floppy disk drive, tape drive, Jaz drive, Zip drive, LS-70 drive, flash memory card, or memory stick. In addition, disk storage 1314 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1314 to the system bus 1308, a removable or non-removable interface can be used, such as interface 1316.

FIG. 13 describes software that acts as an intermediary between users and the basic computer resources described in the suitable operating environment 1300. Such software includes an operating system 1318. Operating system 1318, which can be stored on disk storage 1314, acts to control and allocate resources of the computer 1302. Applications 1320 take advantage of the management of resources by operating system 1318 through program modules 1324 and program data 1326, such as boot/shutdown transaction table and the like, stored either in system memory 1306 or on disk storage 1314. It is to be appreciated that the disclosed embodiments can be implemented with various operating systems or combinations of operating systems.

A user enters commands or information into the computer 1302 through input device(s) 1328 (e.g., a user interface or an interface component). Input devices 1328 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1304 through the system bus 1308 via interface port(s) 1330. Interface port(s) 1330 include, for example, a serial port, a parallel port, a game port, and a universal serial bus (USB). Output device(s) 1336 use some of the same type of ports as input device(s) 1328. Thus, for example, a USB port may be used to provide input to computer 1302, and to output information from computer 1302 to an output device 1336. Output adapter 1334 is provided to illustrate that there are some output devices 1336 such as monitors, speakers, and printers, among other output devices 1336, which require special adapters. The output adapters 1334 include, by way of illustration and not limitation, video and sound cards that provide a means of connection between the output device 1336 and the system bus 1308. It should be noted that other devices and/or systems of devices provide both input and output capabilities such as remote computer(s) 1338.

Computer 1302 can operate in a networked environment using logical connections to one or more remote computers, such as remote computer(s) 1338 (e.g., a family of devices). The remote computer(s) 1338 can be a personal computer, a server, a router, a network PC, a workstation, a microprocessor based appliance, a peer device, a smart phone, a tablet, or other network node, and can include many of the elements described relative to computer 1302. For purposes of brevity, only a memory storage device 1340 is illustrated with remote computer(s) 1338. Remote computer(s) 1338 is logically connected to computer 1302 through a network interface 1342 and then connected via communication connection(s) 1344. Network interface 1342 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks such as Integrated Services Digital Networks (ISDN) and variations thereon, packet switching networks, and Digital Subscriber Lines (DSL).

Communication connection(s) 1344 refers to the hardware/software employed to connect the network interface 1342 to the system bus 1308. While communication connection 1344 is shown for illustrative clarity inside computer 1302, it can also be external to computer 1302. The hardware/software necessary for connection to the network interface 1342 includes, for exemplary purposes only, internal and external technologies such as, modems including regular telephone grade modems, cable modems and DSL modems, ISDN adapters, and wired and wireless Ethernet cards, hubs, and routers.

Figure 14:
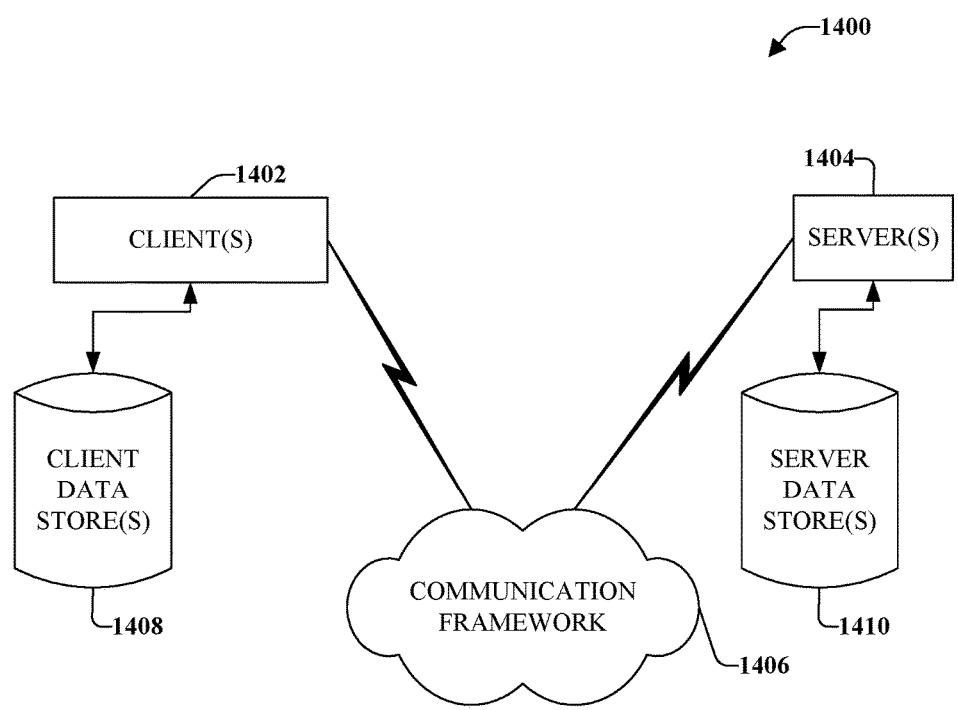
FIG. 14 illustrates a block diagram representing an exemplary non-limiting computing system or operating environment in which various embodiments may be implemented.

Referring now to FIG. 14, there is illustrated a schematic block diagram of a computing environment 1400 in accordance with the disclosed embodiments. The computing environment 1400 includes one or more client(s) 1402 (e.g., laptops, smart phones, PDAs, media players, computers, portable electronic devices, tablets, and the like). The client(s) 1402 can be hardware and/or software (e.g., threads, processes, computing devices). The computing environment 1400 also includes one or more server(s) 1404. The server(s) 1404 can also be hardware or hardware in combination with software (e.g., threads, processes, computing devices). The servers 1404 can house threads to perform transformations by employing aspects of this disclosure, for example. One possible communication between a client 1402 and a server 1404 can be in the form of a data packet transmitted between two or more computer processes wherein the data packet may include video data. The data packet can include metadata, such as associated contextual information for example. The computing environment 1400 includes a communication framework 1406 (e.g., a global communication network such as the Internet, or mobile network(s)) that can be employed to facilitate communications between the client(s) 1402 and the server(s) 1404.

Communications can be facilitated via a wired (including optical fiber) and/or wireless technology. The client(s) 1402 include or are operatively connected to one or more client data store(s) 1408 that can be employed to store information local to the client(s) 1402 (e.g., associated contextual information). Similarly, the server(s) 1404 operatively include or are operatively connected to one or more server data store(s) 1410 that can be employed to store information local to the servers 1404.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, various components described in this description can include electrical circuit(s) that can include components and circuitry elements of suitable value in order to implement the embodiments of the subject disclosure. Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of various embodiments. It is, of course, not possible to describe every conceivable combination of components or methodologies for purposes of describing the one or more aspects, but it is to be appreciated that many further combinations and permutations of the various aspects are possible. Accordingly, the subject disclosure is intended to embrace all such alterations, modifications, and variations. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosed illustrated exemplary aspects of the disclosed subject matter. In this regard, it will also be recognized that the aspects include a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art. Although the components described herein are primarily described in connection with performing respective acts or functionalities, it is to be understood that in a non-active state these components can be configured to perform such acts or functionalities.

In addition, while a particular feature may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component", "module", "system", or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific functions; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Reference throughout this specification to "one implementation," or "an implementation," or "one embodiment," or "an embodiment" means that a particular feature, structure, or characteristic described in connection with the implementation or embodiment is included in at least one implementation or one embodiment. Thus, the appearances of the phrase "in one implementation," or "in an implementation," or "in one embodiment," or "in an embodiment" in various places throughout this specification can, but are not necessarily, referring to the same implementation or embodiment, depending on the circumstances. Furthermore, the particular features, structures, or characteristics may be combined in any suitable manner in one or more implementations or embodiments.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, for example, via access requests, queries, or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, for example, a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In addition, while a particular feature of the disclosed aspects may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for identifying recordings of live events, comprising:

a memory that stores computer executable components; and a processor that executes computer executable components, stored in the memory, comprising:

a reception component that receives a first recording of a live event occurring at a physical venue, the first recoding comprises at least one signal, wherein the at least one signal is overlaid onto the physical venue during a portion of the live event, wherein the first recoding is captured by a recording device, wherein the at least one signal is to be used as a fingerprint for identifying recordings of the live event, and wherein the recording device, capturing in the first recording the portion of the live event of the physical venue and at a time of the portion of the live event, captures the at least one signal with the portion of the live event;

a mapping component that matches the fingerprint to an identifier, wherein the identifier is associated with the live event and the at least one signal is associated to the live event; and an implementation component that:

retrieves a digital rights management policy based on the at least one signal; and applies at least one action based on the matching performed by the mapping component, wherein the at least one action is associated with the identifier and the digital rights management policy.

2. The system of claim 1, wherein the first recording of the live event comprises a second signal and the mapping component matches the second signal to the identifier.

3. The system of claim 1, wherein the reception component receives a second recording that comprises a second signal and the mapping component matches the second signal to the live event, the first recording and the second recording are in a same format or are in different formats.

4. The system of claim 3, wherein the implementation component aggregates the first recording and the second recording to create a social experience from at least two perspectives.

5. The system of claim 1, wherein the implementation component categorizes the first recording for searchable elements.

6. The system of claim 1, wherein the at least one signal is a digital audio signal that is mixed with a plurality of audio signals generated at the live event.

7. The system of claim 1, wherein the at least one signal is a digital image projected in a direction of the live event, the digital image is superimposed on a picture of the live event.

8. The system of claim 1, wherein the at least one signal is a light modulated in a detectable pattern aimed at the live event and captured in the first recording.

9. The system of claim 1, further comprising a confidence component that uses at least two signals to increase a level of confidence that the at least one signal is associated with the live event.

10. The system of claim 1, further comprising a confidence component that combines the at least one signal with global positioning system information or time information to increase a level of confidence that the at least one signal is associated with the live event.

11. The system of claim 1, wherein the first recording is at least one of an audio version of the live event, a still picture of the live event, and a video of the live event.

12. A method for identifying recordings of live events, comprising:
employing a processor to execute computer executable components stored within a memory to perform the following:
generating a first signal for a live event, the live event occurring at a physical venue,
wherein the first signal is to be used as a fingerprint for identifying recordings of the live event,
wherein the first signal is to be overlaid onto the physical venue during a portion of the live event, and
wherein a recording device, capturing in a recording the portion of the live event of the physical venue and at a time of the portion of the live event, captures the first signal with the portion of the live event;
receiving a first recording of the live event comprising the first signal, the first recoding captured by the recording device;
accessing a database comprising a plurality of signals, including the first signal, mapped to a plurality of identifiers associated with events;
matching the fingerprint to at least one of the plurality of signals to retrieve an identifier associated with the live event, wherein the at least one of the plurality of signals being the first signal;
associating the first recording to the identifier associated with the live event based on the matching; and
triggering an action as a function of the associating, the triggering comprising:
retrieving a digital rights management policy based on the at least one of the plurality of signals; and
triggering the action based on the digital rights management policy.

13. The method of claim 12, wherein the triggering comprises associating searchable elements with the first recording.

14. The method of claim 12, further comprising:
receiving a second recording that comprises a second signal;
matching the second signal to the live event; and
aggregating the first recording and the second recording.

15. The method of claim 14, wherein the aggregating comprises creating a social experience from at least two perspectives.

16. The method of claim 14, wherein the first recording and the second recording are a visual signal and an audio signal projecting on a same event.

17. A device for identifying recordings of live events, comprising:
a memory that stores computer executable components; and
a processor that executes computer executable components, stored in the memory, comprising:
a signal generation component configured to generate at least one signal for a live event, the live event occurring at a physical venue,
wherein the at least one signal is to be used as a fingerprint for identifying recordings of the live event,
wherein the at least one signal is to be overlaid onto the physical venue during a portion of the live event, and
wherein a recording device, capturing in a recording the portion of the live event of the physical venue and at a time of the portion of the live event, captures the at least one signal with the portion of the live event;
a reception component that receives a first recording of the live event, the first recording comprises the at least one signal and is in a first format, the first recoding captured by the recording device;
a mapping component that retrieves, based on the fingerprint, a predefined identifier associated with the live event, the predefined identifier comprises metadata related to the live event; and
an implementation component that:
retrieves a digital rights management policy based on the at least one signal; and
applies at least one action based on the matching performed by the mapping component and the digital rights management policy.

18. The device of claim 17, wherein the reception component receives a second recording of the live event, the second recording comprises a second signal and the mapping component matches the second signal to the predefined identifier associated with the live event, the device further comprising:
an aggregation component that combines the first recording and the second recording to create a collective social experience.

* * * * *